(12) United States Patent
Massey

(10) Patent No.: US 8,800,102 B1
(45) Date of Patent: Aug. 12, 2014

(54) STABILIZING LEG EXTENSION FOR CARPET STEAM CLEANER

(76) Inventor: Gordon Wright Massey, Madison, WI (US)

(*) Notice: Subject to any disclaimer, the term of this patent is extended or adjusted under 35 U.S.C. 154(b) by 96 days.

(21) Appl. No.: 13/555,146

(22) Filed: Jul. 21, 2012

(51) Int. Cl.
*A47L 11/34* (2006.01)
*A47L 9/00* (2006.01)

(52) U.S. Cl.
USPC ............................................ 15/320; 15/414

(58) Field of Classification Search
CPC ... A47L 9/0009; A47L 9/0045; A47L 9/0036; A47L 9/0027
USPC ......... 15/320–322, 415.1, 345, 416, 417, 414
See application file for complete search history.

(56) References Cited

U.S. PATENT DOCUMENTS

| | | | | |
|---|---|---|---|---|
| 2,570,346 | A | | 10/1951 | Hoover |
| 2,888,713 | A | * | 6/1959 | Cook et al. ...................... 536/38 |
| 3,048,876 | A | * | 8/1962 | Kemnitz .......................... 15/321 |
| 3,231,922 | A | | 2/1966 | Smith |
| 3,751,747 | A | * | 8/1973 | Blaeldh ......................... 401/131 |
| 4,307,484 | A | * | 12/1981 | Williams ........................ 15/321 |
| 4,472,855 | A | | 9/1984 | Murphy et al. |
| 6,662,402 | B2 | | 12/2003 | Giddings et al. |
| 7,751,955 | B2 | | 7/2010 | Hiltz |
| 2002/0162187 | A1 | * | 11/2002 | Keller ............................. 15/345 |
| 2004/0093683 | A1 | * | 5/2004 | Wallace .......................... 15/321 |
| 2004/0172769 | A1 | | 9/2004 | Giddings et al. |
| 2005/0273972 | A1 | * | 12/2005 | Park ................................ 15/414 |
| 2007/0186367 | A1 | | 8/2007 | Field et al. |
| 2009/0064449 | A1 | * | 3/2009 | Newton et al. ............... 15/327.1 |

FOREIGN PATENT DOCUMENTS

| | | | | |
|---|---|---|---|---|
| DE | 19520236 A1 | * | 12/1996 | ................ A47L 9/00 |
| JP | 2010264207 A | * | 11/2010 | ................ A47L 9/00 |

* cited by examiner

*Primary Examiner* — Mark Spisich
*Assistant Examiner* — Andrew A Horton
(74) *Attorney, Agent, or Firm* — Loyd W. Bonneville

(57) ABSTRACT

The forwardly projecting wand of a conventional commercial carpet steam cleaner is propped up by a connected stabilization leg extension so as to reduce the weight imposed upon the operator by the cleaner during its operation. The stabilizing leg extension is provided the same cleaning capabilities the conventional cleaner has so that, modified in this way, the number of cleaning members is doubled and twice as much of the cleaning area is covered with each stroke of the wand. Handlebars are added to further ease the task and an attached stowage nest is incidentally included for a supplementary cleaning extension.

20 Claims, 17 Drawing Sheets

STABILIZING LEG EXTENSION FOR CARPET STEAM CLEANER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

Carpet steam cleaning equipment

2. Description of Related Art

The term attach or fasten or any of their forms when so used means that the juncture is of a more or less permanent nature, such as might be accomplished by nails, screws, welds or adhesives. Thus it is stated herein that the height adjustment pin (18) is attached to the stabilizing leg extension (1).

The word comprise may be construed in any one of three ways herein. A term used to describe a given object is said to comprise it, thereby characterizing it with what could be considered two-way equivalency in meaning. Thus, it is stated that FIG. 15 comprises a perspective exploded view of height adjustment means (3), meaning that the latter is in fact the former and the former, the latter. The term comprise may also be characterized by what might be considered one-way equivalency, as when it is stated herein that what might be considered one-way equivalency, as when it is stated for certain assemblies herein that inter-threading (71) comprises the stabilizing leg extension's (1) connection means (15) to the cleaning wand (200). This use of the word has a generic sense to it. That is, the inter-threading (71) of parts will always amount to connection means (15) but connection means (15) may be inter-threading (71) in one case but something else—telescopic force-fitting (72), for instance—in another. However, the word comprise may also be used to describe a feature which is part of the structure or composition of a given object. Thus, it is said the steam cleaning wand (200) comprises a cleaning head (203). The meaning in the respective cases is clear from context, however. Accordingly, modifying words to clarify which of the three uses is the intended one seem unnecessary.

Terms relating to physical orientation such as top or bottom, upper or lower, upwards or downwards, refer to the positioning of an object in the manner in which it would be typically oriented for use or viewing. It is, thus, said that the cleaning wand's cleaning head (203) is disposed at the lower end thereof, that the stabilizing leg extension (1) comprises and upper connective end (12) and a lower cleaning end (11); that it (1) extends downward to contact the carpet (600); and that supplemental cleaning extensions may be disposed upon the cleaning wand's (200) upper surface within a stowage nest (5) provided therefor. Such terms are meant to retain their meaning regardless of reorientation such as, for instance, even if the cleaning assembly were displayed upside down.

In some instances, words or phrases have been expressed as adjectives or nouns in a shorthand manner or even coined herein to suit needs for convenient description or clarification. Thus, the term spring-loaded denotes the presence of a tensioned spring feature by which an object is urged in movement from one disposition or position to another.

Similarly, the adjective snap-fit locking fashion expresses mechanical phenomena with particular reference to spring-loaded adjustment features wherein, for example, a mobile pin (181) may be made to seat within an immobile receptacle detent (32) provided for it and become dependably retained, or locked, thereby. The arrangement infers spring-like flexibility in the mobile member wherein it is forced into a tensioned state until released, urging it to suddenly resume or snap into a state of non-tension.

The phrase continuous communication describes a condition in which two chambered constructs are connected together in a manner which permits the passage of the contents of one to interchange smoothly with the other. Thus, where there is a juncture of one system with another attended by flowage of air or liquids, the contents are disposed to flow in each of them unimpeded by any interposing obstacle, such as might be suitable for a bifurcated steam cleaning tube through which air or liquid is designed to flow in a given direction. The term, thus, denotes an opened, rather than closed, state between the two joined conduits.

The term telescopic, an unfortunate misapplication of an adjective intended for a certain other more appropriate description, is adopted herein because of its widespread acceptance to describe in shorthand expression the force-fitting of tubular components wherein the outer diameter of the inserted member comprises smaller dimension than the inner diameter of the receiving member. It, thus denotes a sleeved relationship between the two and in this usage has absolutely nothing to do with the optical magnifying instrument which only incidentally comprises those connecting properties.

While undertaking a carpet (600) steam cleaning task wherein pressured steam is remotely powered from a steam generator and suctioned waste withdrawn from the carpet is transferred by conduit (220) to a waste collector at the remote site,—clearly a commercial enterprise—the operator (500) grips the cleaning wand (200) with both hands. The traditional cleaning wand (200) is often provided a handhold (207) to accommodate one of the operator's (500) hands, the other grasping the wand (200) somewhere nearby along its (200) length such that the operator's (500) body is somewhat forwardly inclined in the effort. Experience teaches that by reason of that ill-postured stance, the task is accompanied by considerable unwanted back strain. Those who undertake carpet (600) steam cleaning day after day experience severe back discomfort, often to the point of suffering life-long injury as a result. It is the weight of the liquid cleaning agents coursing through the wand (200) as well as that of holding up and guiding the cantilevered equipment itself which is responsible for the problem. That has historically led to the development of equipment designs tending to minimize the weight-borne difficulties.

We have had with us the more truly upright constructions, such as those for home operated vacuum cleaners, for example—and there are extant vacuum cleaners which are convertible to carpet cleaners upon the substitution of appropriate gadgetry.

Efforts to ease the manual energy required to operate any carpet (600) steam cleaning equipment have been underway for some time. There have been a number of patented arrangements wherein the quest for suitable weight distribution during operation was thought to be fulfilled merely by disposing a set of wheels back slightly toward the operator (500), usually inside a housing enlarged for the purpose. Some of those include U.S. Pat. No. 6,662,402 issued to and U.S. Pub. No. 2004/0172769 filed by Giddings, et. al.; U.S. Pat. No. 7,761,955 issued to Hiltz; and U.S. Pub. No. 2007/0186367 filed by Field, et. al.

Where wheels are added to the cleaning end (201) of the more upright units to provide a more gliding action to the work, they are invariably placed—probably for reasons of streamlined product consolidation—within only a few inches of the weight-contributing cleaning end's suction. True, the point at which the wheels roll upon the carpet (600) may be perceived as an incidental leverage fulcrum as well as a friction relieving device. However, their short displacement from the cleaning action has provided only a very limited leverage benefit. Helpful as wheels might be for the more residentially operated upright or canister designs, they seem to have been withheld from employment in the forwardly directed wand (200) mechanisms used commercially—perhaps wisely so.

For professional carpet (600) steam cleaning, experience has taught the benefit of employing a machine with a wand (200) directed forward at an angle of declination from the horizontal. One can see that such a design provides more of a desired horizontal force vector component to the operation and is, therefore, more effective. However, that does not eliminate the problem. The operator (500) still bears considerable cantilevered weight in undertaking the task even when the design is such as to permit a more upright posture during the effort.

What seems to be most needed is a way to reduce the effect of the cantilevered weight imposed upon the operator (500)—the provision of something shifting the force component vectors around to provide upward support against the wand's (200) lateral aspect. This was very nearly perceived in U.S. Pat. No. 3,231,922 issued to Smith and U.S. Pat. No. 4,472,855 issued to Murphy, et. al., where, in each, a pivotable leg could be swung from a stowed position into a dependable support for useful self-standing walk-away disposition. Although not quite as instructive, U.S. Pat. No. 3,048,876 issued to Kemnitz should not be overlooked on the matter of walk-away stowage supports. In Murphy, et. al, the inventor spoke in terms of "three point support", provided by the cleaning end's (201) contact with the carpet (600) together with a U-shaped prong at the end of the support permitting the wand's (200) weight to be shared there at two of the three points. Had the Smith and Murphy, et. al. patents not been limited by their proclaimed features, the support legs of either might well have been permitted, with a little modification, to play a weight-sharing role during the carpet (600) steam cleaning operation itself. Earlier, in U.S. Pat. No. 2,570,346 issued to Hoover, a step had been tentatively taken in that direction, wherein the cleaning unit could be re-stationed from time to time, as it were, although not moved about upon the support during actual cleaning operation. Aside from those, there appears to be no other truly relevant precedent along that line. Nonetheless, this useful bit of history should be recognized as one serving as a guide to the subject matter hereof.

If a support could be devised to share the steam cleaner's weight during actual operation, as opposed merely to walk-away stand alone purposes, further innovation might even permit its construction to participate not only in weight sharing but in the cleaning operation itself. This might be feasible by forming the support as part of a bifurcated or Y-shaped cleaning wand (200) which emits pressured steam and cleaning agents into the carpet (600) and withdraws air and soiled liquid from it—just as in the manner of the more traditional steam cleaning wand (200) itself. The doubled cleaning head (203) thus provided would offer even more enhancement to the system. Granted, there are doubled head (203) carpet (600) steam cleaners extant which incidentally even provide some increased operation stability as well as that for the equipment's stowage or walk-away stand alone purposes. However, because those fall more generally into the category of upright or canister cleaners, they bear little relevance to the currently more favored wand type (200) commercial steam cleaner wherein cantilevered weight imposes such an unwanted challenge upon the operator (600).

BRIEF SUMMARY OF THE INVENTION

A stabilizing leg extension (1) is provided for an otherwise conventional manually manipulated commercial carpet cleaning wand (200)—comprising carpet (600) steam cleaner, disposed at a point along the wand (200) such that, extending downward, it (200) contacts the carpet (600) at a point far enough back from the wand's cleaning end (201) to share the weight otherwise borne by the operator (600) during the cleaning operation.

Once having established the stabilizing feature as subject matter herein, it is feasible to configure the leg extension (1) as a kind of tubular wand, alluded to supra, in and of itself. Thus, the leg extension (1) may be made to function in the same manner as the cleaning wand (200), thereby creating an assembly with a doubled cleaning head (203). The stabilizing leg extension (1) is formed of tubular construction and provided with features at its carpet-contacting end (201) which closely, if not exactly, match those of the cleaning wand (200) itself. The leg extension (1) is connected to the wand (200) in any one of several ways, all of which permit the same cleaning operation—the emission of cleaning agents and withdrawal of air and soiled liquid—undertaken with the wand (200). By reason of its (1) disposition, the entire cleaning assembly is, one might say, provided a doubled cleaning head (203).

Although it is tempting to consider this functional adaptation as only an incidentally provided feature, it should, nevertheless, be recognized as an important one, because a doubled cleaning head (203) doubles the cleaning area (700) with each stroke of the wand (200) upon the carpet.

The stabilizing leg extension's (1) means of connection (15) to the wand (200) may comprise inter-threading (71), force-fitted (72) components or any other dependable connection (15) means, including for an alternative configuration to the entire assembly, that of welding (73).

Height adjustment means (3) are also disposed upon the stabilizing leg extension (1) wherein an adjustment pin (18, 181) engages a selected adjustment receptacle detent (32) within a height adjustment connection tube (31).

Also optionally present is a stowage nest (5) for emplacement of supplementary cleaning devices disposed upon the wand's (200) upper surface—such as a cleaning extension (250) for a flight of stairs—and in addition to the stowage nest, a set of handlebars (4) to facilitate the operator's (600) control during operation.

Although the invention is often described herein in singular terms, it is plausible for the entire cleaning assembly to comprise more than one stabilizing leg extension (1). In that connection, the addition of a second one (1) would appear to add stability to the apparatus by reason of enlarged triangulated support.

While the inventive subject matter hereof is most often generally discussed in terms of one or more improvements to a conventional commercial carpet (600) steam cleaner, it may also be characterized as such a cleaner together with the enumerated features herein—that is, a newly presented carpet (600) steam cleaner as a unified entity.

BRIEF DESCRIPTION OF THE SEVERAL VIEWS OF THE DRAWINGS

Solid lines in the drawings represent the invention. Dashed lines represent either non-inventive material, that not incorporated into an inventive combination hereof and which may be the subject of another invention, or that which although so incorporated, lies beyond the focus of attention. A heavily framed rectangle of a portion of the drawing is representative of a number of specific variations of the more generic feature it symbolically identifies.

DETAILED DESCRIPTION OF THE INVENTION

Figure 1:
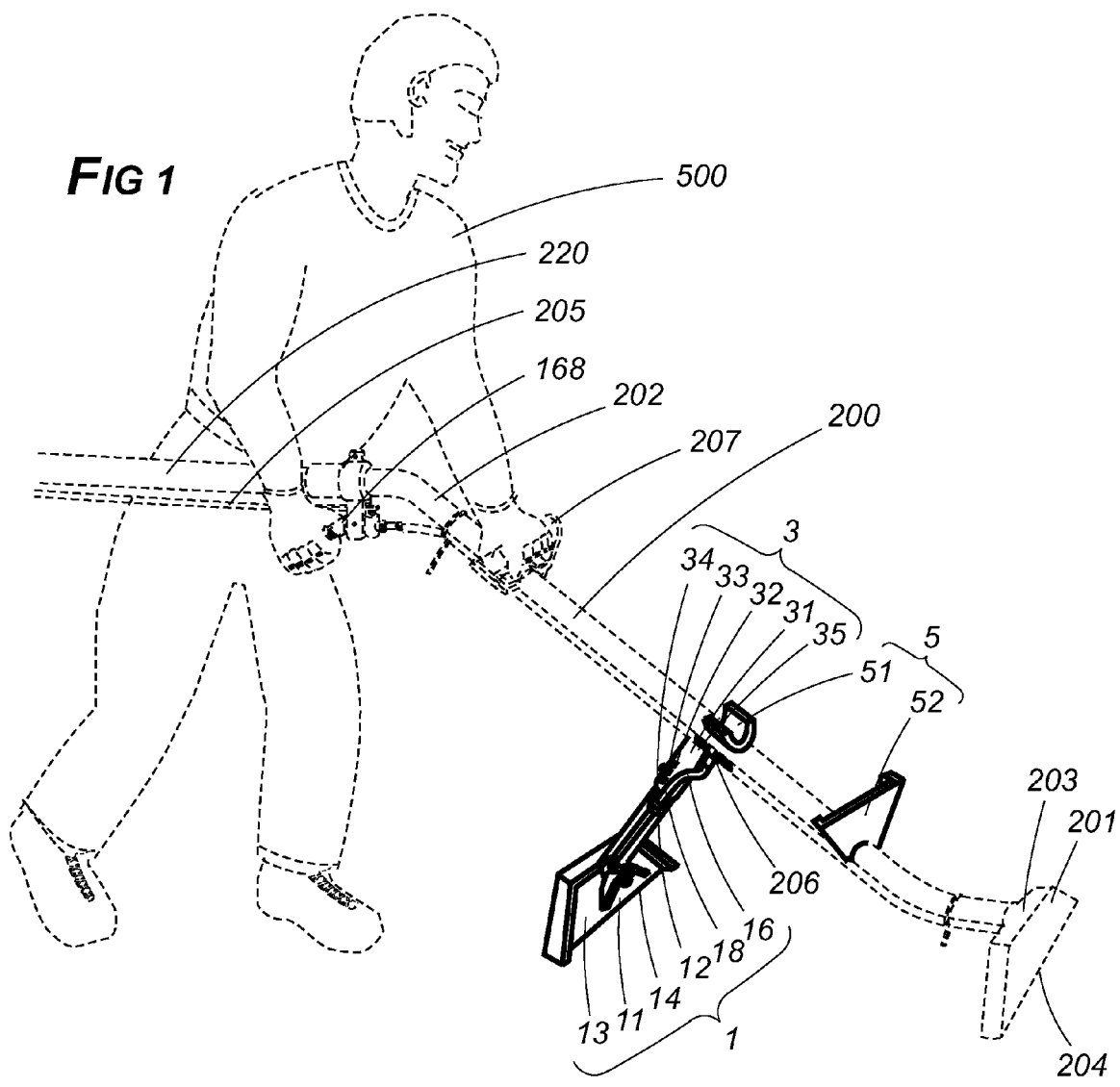
FIG. 1 comprises a perspective view of the operative use of the cleaning assembly illustrating as inventive improvements which are the subject hereof, the stabilizing leg extension (1) and the stowage nest assembly (5).

The subject matter hereof comprises in the main, an assembly comprising major improvements to a conventional commercial carpet (600) steam cleaner. A most important of these is the provision of a stabilizing leg extension (1) which, experience demonstrates, reduces the weight borne by the carpet steam cleaning operator (500) by reason of its (1) underlying support and, incidentally, increases the amount of work accomplished without substantial additional effort. Another of these is the inclusion of bicycle-like handlebars (4), contributing even more to the ease of operation. Yet another, more incidental than the others, is the presence of attached hardware for the stowage of other carpet (600) cleaning tools, such as a stair cleaning extension (250). In another respect, however, the subject matter may be considered to comprise the entire assemblage as a unified whole—a carpet (600) steam cleaner in its totality, of which this combination of these new features comprises merely a part.

The traditional commercial carpet (600) steam cleaner, upon which the subject matter hereof will be conferred comprises a tubular elongated carpet steam cleaning wand (200) comprising a cleaning end (201) and a manipulative end (202). The wand (200) is configured such that during carpet (600) cleaning operation, it (200) is disposed to extend forwardly from a point midway between the operator's (500) hands to the center of its (200) area of contact with the carpet (600), generally at an angle of declination from horizontal within a range of measurement between 20° and 55°.

The wand (200) is further configured to withdraw suctioned air and soiled liquid from a carpet (600) through the cleaning end (201) thereof for transfer by conduit (220) to the remote suctioned waste collector. At that end (201) is disposed a head (203) comprising a cleaning face (204) configured for flush disposition upon the carpet (600). Coupled to the wand (200) and the conduit (220) to the remote steam generating site is a steam hose (205) disposed to selectively emit and force pressured steam and cleaning agents into the carpet (600) through the wand head's face (204), the emissions from the hose (205) and withdrawals through the wand (200) controlled by operation of a trigger (168) at the wand's manipulative end (202).

The assembly which is the subject hereof, comprises one or more stabilizing leg extensions (1) of tubular configuration, each connected to the steam cleaning wand (200) at a point along its (200) length, extending downward toward the carpet (600) and thereby conferring a bifurcation upon the wand (200). A connection orifice (208) is, therefore, cut into the cleaning wand (200) at the point of connection. The provision of the stabilizing leg extension (1) assures the sought-after upward force vector component support, supra, against the wand's (200) forwardly angled extension. Care is taken to dispose the support far enough back from the center of the cleaning wand's (200) area of contact with the carpet (600) to provide the benefit desired. In the absence of any mathematical formula which would dictate the exact place at which such a stabilizer (1) should most advantageously be selected, it may, be safely stated that, although there is no absolute requirement to allow for a precise span between the center of the wand's (200) area of contact with the carpet (600) and the center of the stabilizing leg's (1) area of contact therewith (600), a preferable distance might equal or exceed 18 inches. In considering that distance, therefore, the stabilizing leg's (1) point of attachment with the cleaning wand (200)—and, accordingly, the exact situs on the wand (200) of the connection orifice (208) for that purpose—may be considered merely one of more or less arbitrary selection depending upon the downwardly angled disposition of the stabilizing leg extension (1). Thus, some might consider an arrangement wherein the stabilizing leg (1) projects downward at right angles from the cleaning wand (200) most beneficial. However, again, experience suggests that the nearer the 18 inch limit the stabilizing leg's (1) point of contact with the carpet (600) is, the more it should be obtusely angled backward toward the operator (500) and the greater the span of separation, the more acute the angular disposition should be.

The placement of the stabilizing leg (1) in its (1) supportive disposition provides an opportunity for the inclusion of yet another beneficial feature. Herein, it (1) is designed to comprise a cleaning head (13) at the lower end (11) thereof—the cleaning end (11)—which duplicates that (203) of the cleaning wand (200), thereby conferring upon the carpet (600) cleaning assembly an additional cleaning head (13). It may, therefore, be stated more formally that as in the manner of the cleaning wand itself (200), the stabilizing leg extension (1) comprises a cleaning end (11) configured with a head (13) comprising a cleaning face (14) for flush disposition upon the carpet (600). Consistently, the leg extension (1) is disposed by reason of its similar configuration to withdraw suctioned air and soiled liquid from the carpet (600) through its cleaning end (11) in the same way. Moreover, it may be stated that the stabilizing leg extension (1) is disposed either directly—or indirectly should height adjustment means (3) be present, ante—by connection means (15) to the cleaning wand (200) at the connection orifice (208) such that the passage of suctioned air and soiled liquid withdrawn from the cleaning ends (11 and 201 respectively) of both the extension (1) and the wand (200) comprises one of continuous communication—which is to say that the passage of air and soiled liquid through both (1 and 200, respectively) is unimpeded by any obstruction where the two (1 and 200, respectively) are joined.

Again, in the same manner as for the cleaning wand (200), the stabilizing leg extension (1) further comprises coupled to it (1) a length of steam and cleaning agent hose (16) disposed to selectively emit and force pressured steam and cleaning agents into the carpet (600) through the extension head's face (14). The extension's length of steam and cleaning agent hose (16) is disposed by connection to the steam cleaning wand's steam and cleaning agent hose (205), for which purpose the wand (200) comprises a T-bifurcated pressured steam and cleaning agent hose connection valve (206) through which the extension's length of hose (16) is connected. The fluvial passage through the hoses (16 and 205, respectively) of both the extension (1) and the cleaning wand (200), therefore, also comprises one of continuous communication, the passage of steam through both (16 and 205, respectively) unimpeded by any obstruction where the two (16 and 205) are joined.

Figure 13:
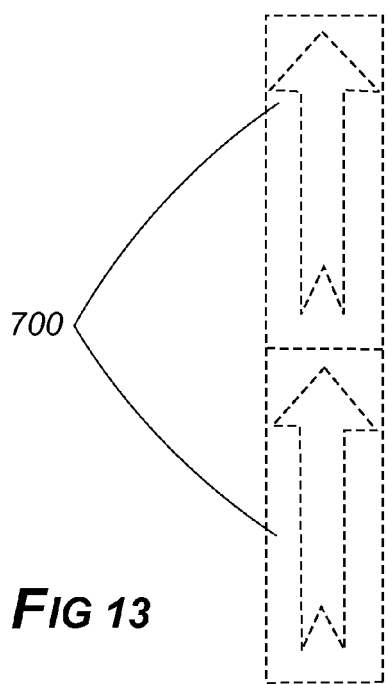
FIGS. 13 and 14 represent portrayals of the area cleaned (700) in carpet (600) cleaning operation by reason of movement of the doubled head (13, 203), the former indicating the advance stroke, the latter, the return stroke.
Figure 14:
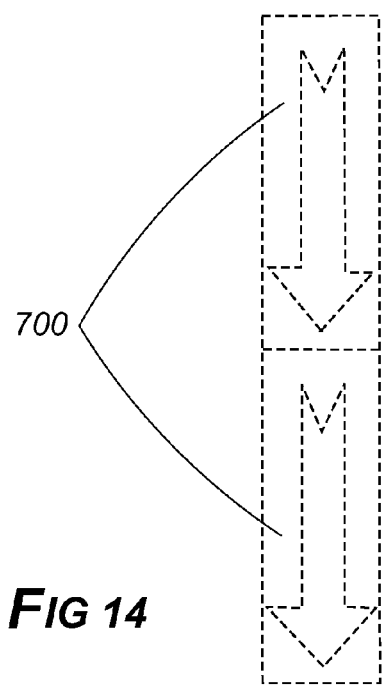
Figure 15:
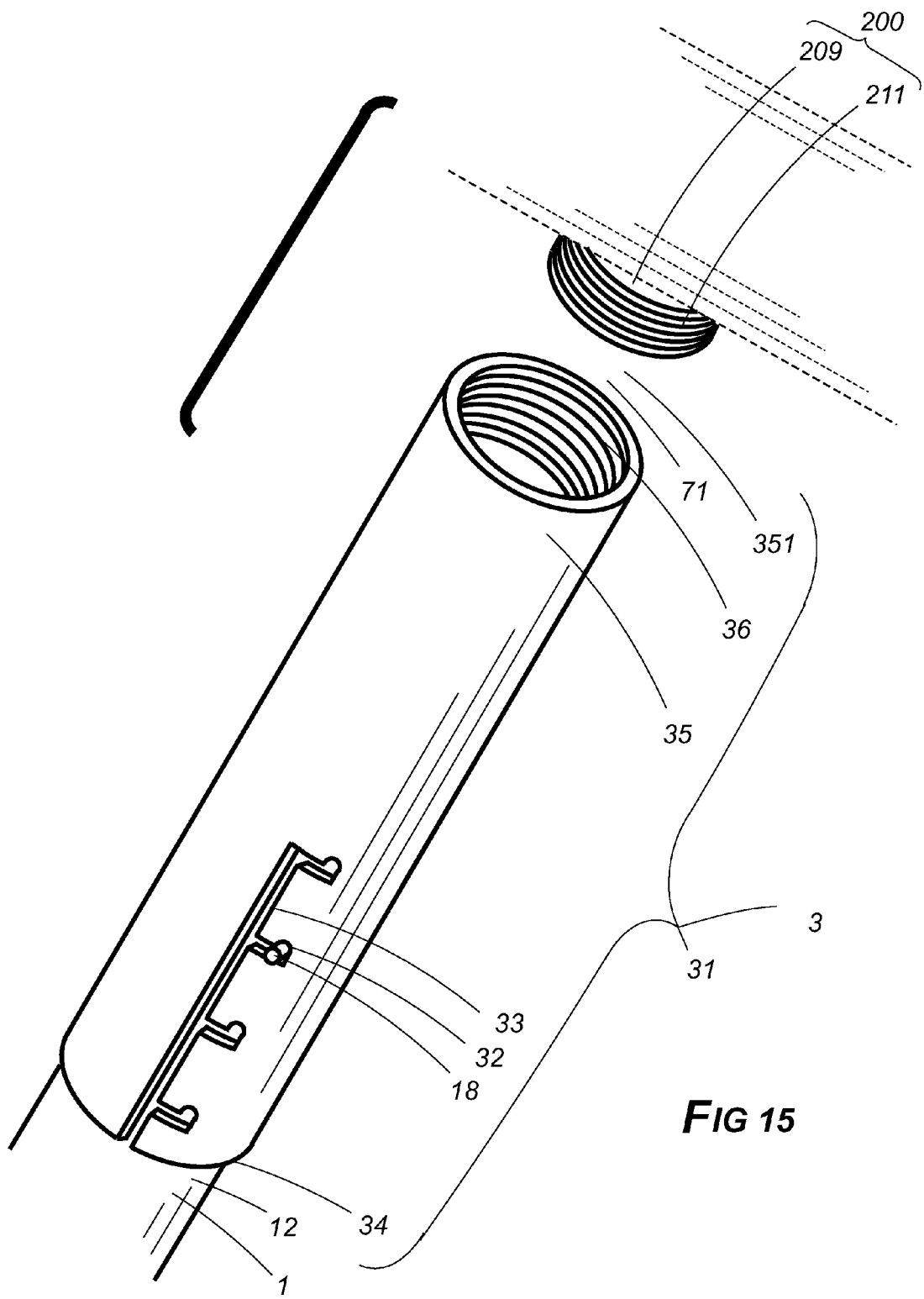
FIG. 15 comprises a perspective exploded view of a height adjustment means (3).
Figure 16:
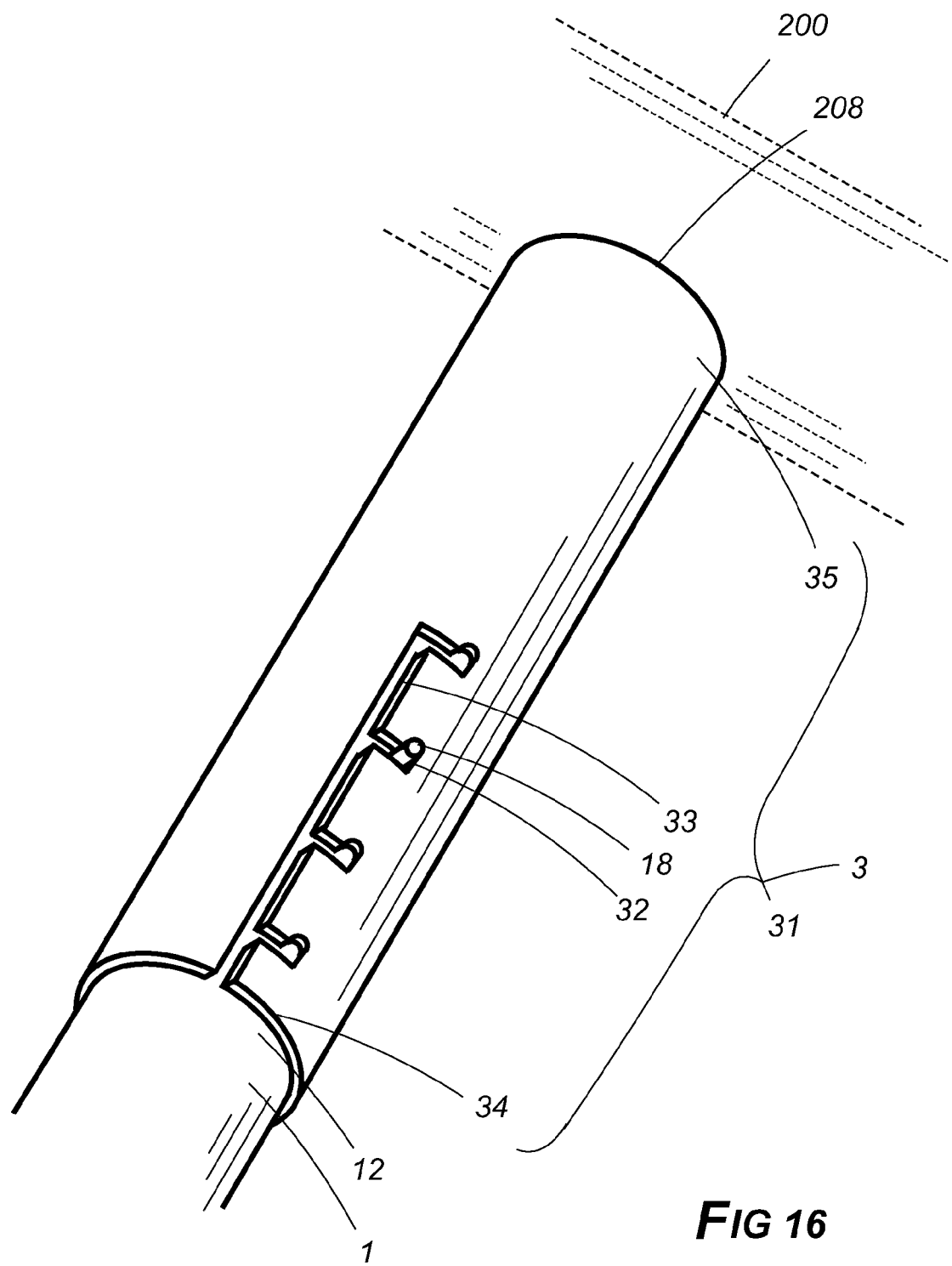
FIG. 16 comprises a perspective view of the connected height adjustment means (3).
Figure 17:
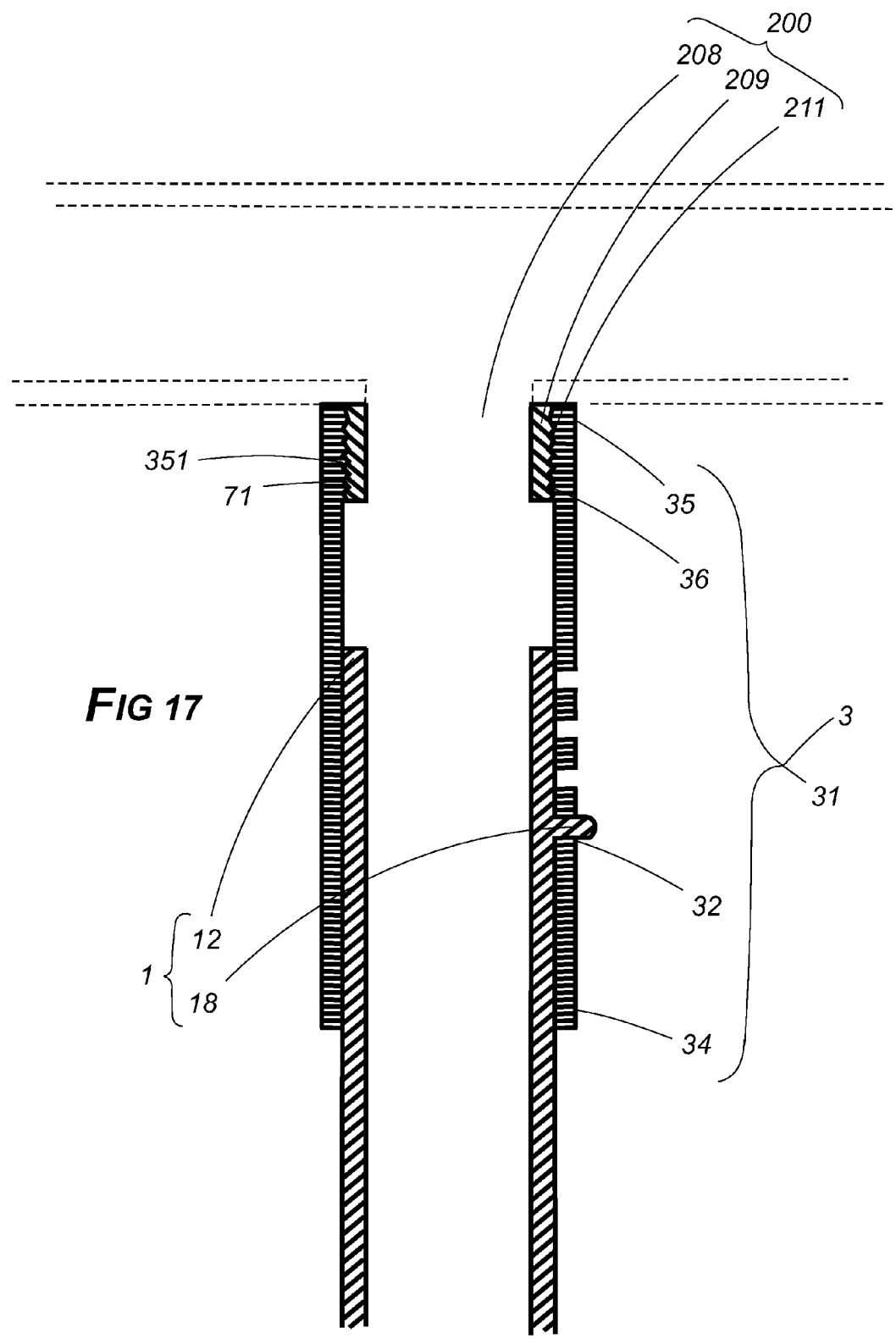
FIGS. 17 and 18 are cross-sectional views of the height adjustment means (3) comprising pin (18) and channel (33) adjustment members for different adjustment positions.
Figure 18:
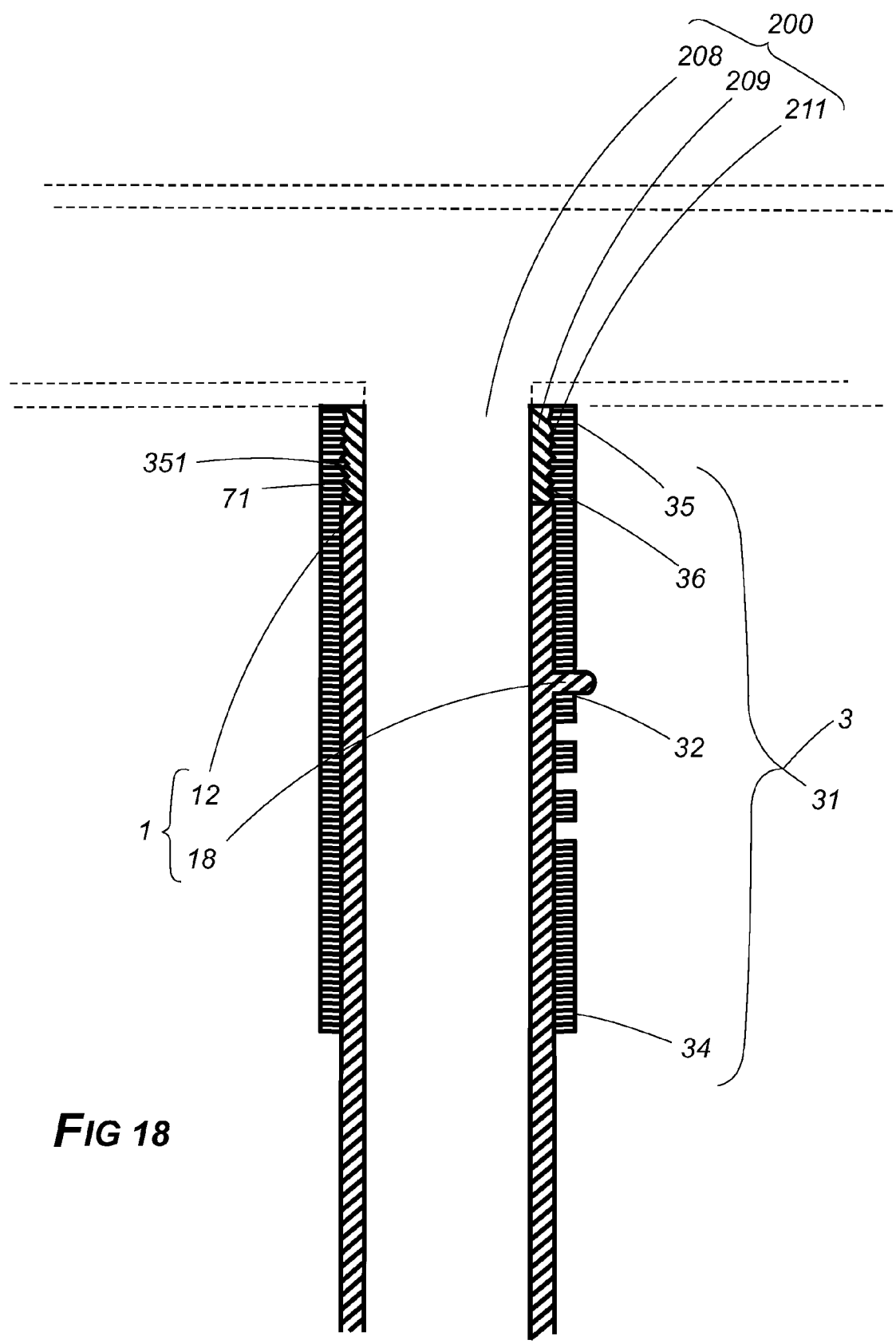
Figure 19:
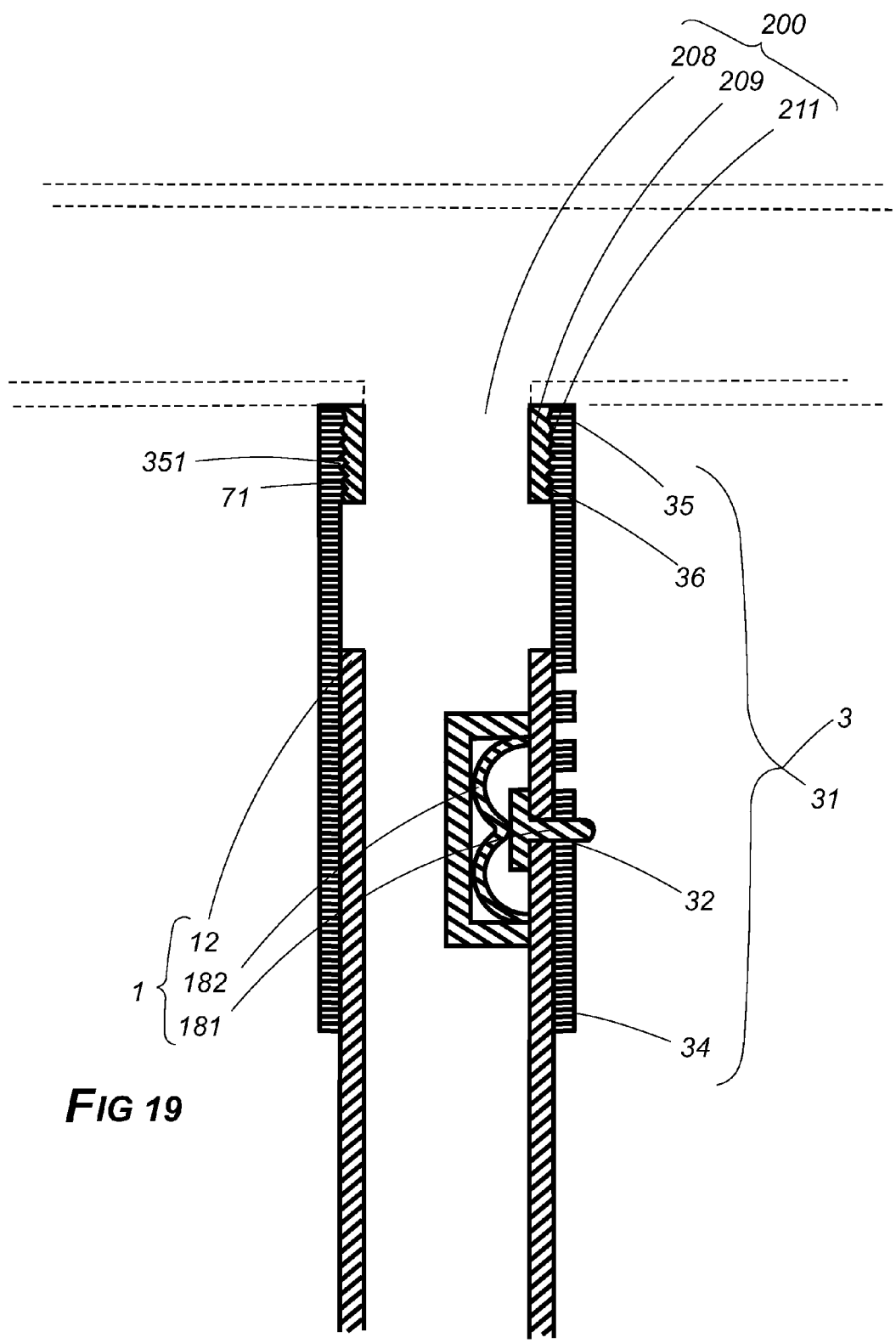
FIGS. 19 and 20 are cross-sectional views of the height adjustment assembly showing spring-loaded adjustment members (181, 182).
Figure 20:
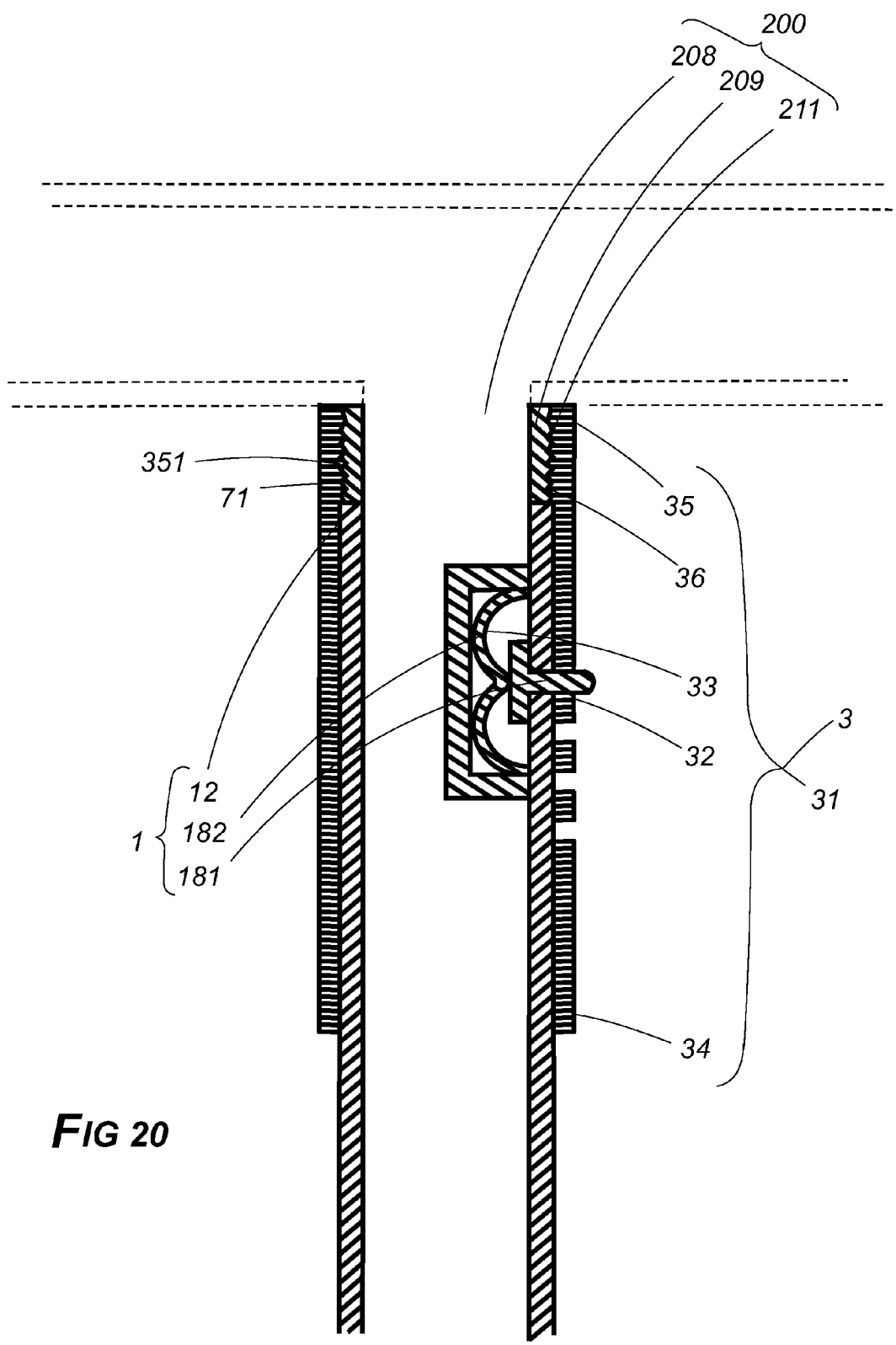

As an incidental, but nevertheless important, benefit from the assembly, it should be observed that by reason of the presence of the additional cleaning head (13), as the steam cleaning wand (200) comprising the extension (1) is manipulatively pushed and pulled by the operator (500) across the carpet's (600) surface, the cleaned area (700) is essentially doubled with little or no increased effort. Thus, as shown in FIGS. 13 and 14, where the arrows portrayed symbolically represent the direction of the steam cleaning stroke, as the cleaning wand (200) and stabilizing leg extension (1) are advanced together as in FIG. 13, the two cleaned areas (700) depicted result rather than merely one were only the cleaning wand itself (200) available for employment. FIG. 14 is shown to reinforce this benefit during the return stroke.

It is an immediately apparent feature of this arrangement that the stabilizing leg extension's (1) size, configuration and disposition with respect to the cleaning wand (200) is such that during the carpet (600) steam cleaning operation, the extension (1) shares the weight of the wand (200) as well as the bounty of increased cleaning area (700). Beyond that, however, the assurance of the presence of those properties is such that the wand (200) and connected extension (1) may be left unattended—that is, left standing—without tipping. While the inherent arrangement by which the cleaning wand (200) is propped up by the stabilizing leg extension (1) tends to provide that assurance, the extension's (1) contact point with the carpet (600) is disposed back toward the operator (500) from the wand's head (203) a distance optimizing the balance of weight. Moreover, care is also taken to design the leg extension's head (13) in size and configuration to further contribute to fulfillment of that objective.

While much of what has been said is cast in singular expression, it should be acknowledged that more than one stabilizing leg extension (1) may be connected to the cleaning wand (200). Thus, if it were considered benefit would be provided, for example, by the triangular support of even one additional extension (1), that option might be undertaken. The disclosure hereof is, therefore, intended to covey that possibility.

Figure 2:
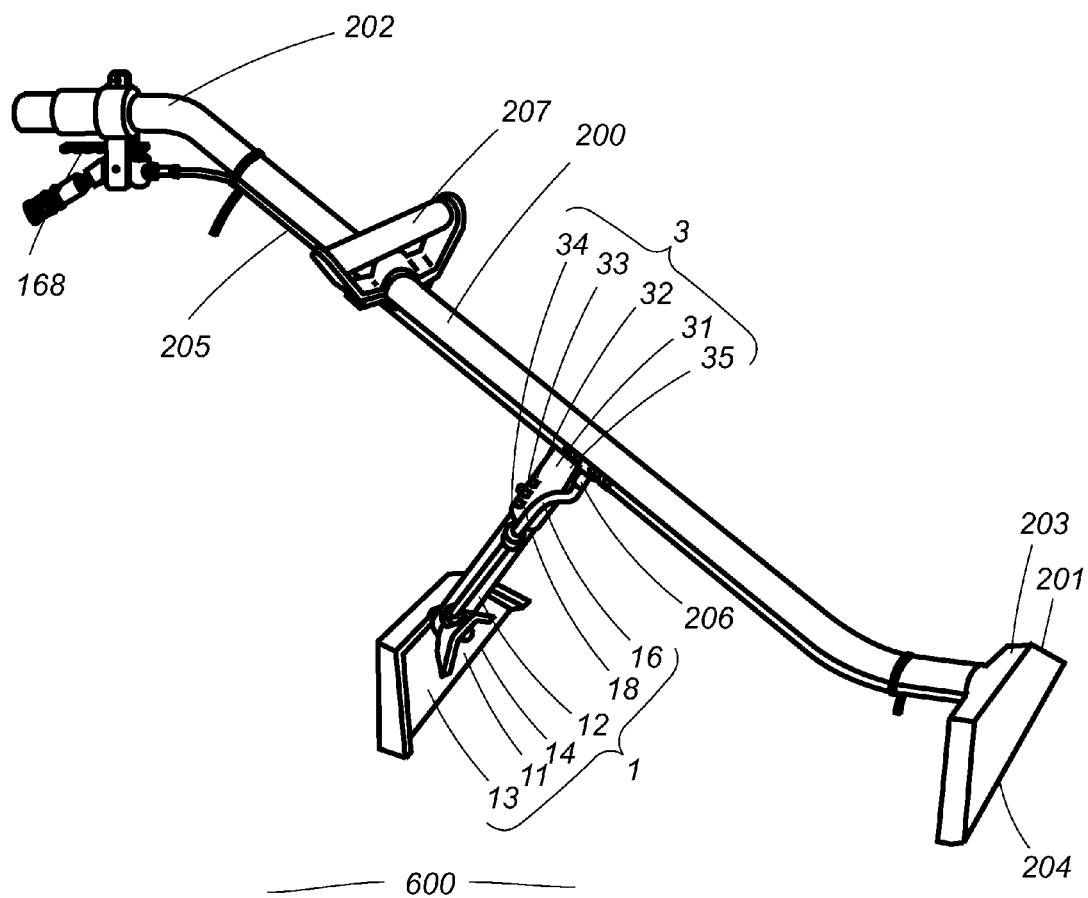
FIG. 2, also in perspective, depicts the entirety of the cleaning assembly as a whole, rather than in terms merely of improvement to an existing conventional assembly.
Figure 3:
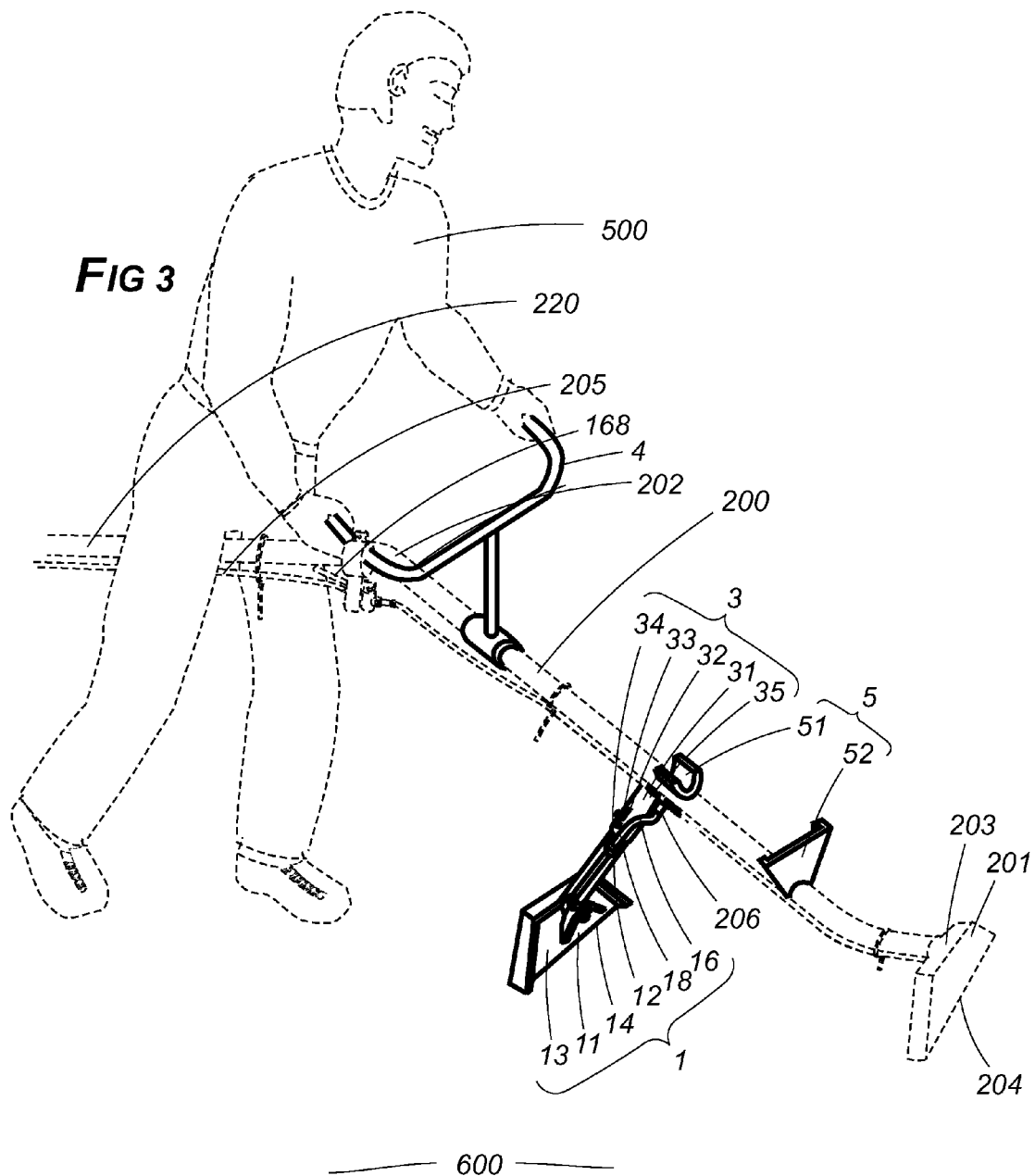
FIG. 3 depicts in perspective the operative use of the cleaning assembly illustrating in addition to those improvements addressed in FIG. 1, a set of handlebars (4) thereto.
Figure 4:
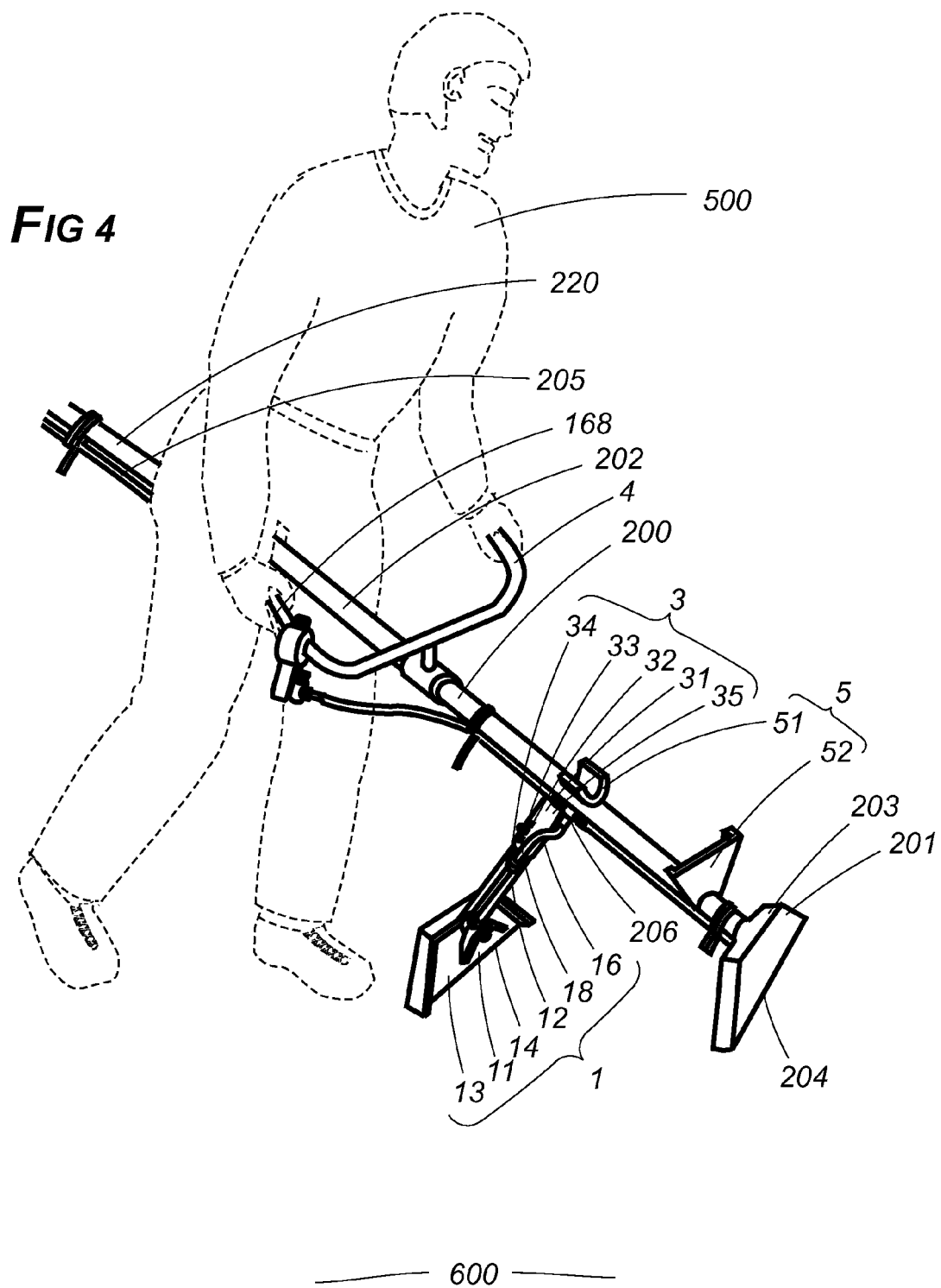
FIG. 4 comprises a perspective view, as in the case of FIG. 2, of the entirety of the cleaning assembly including the handlebars (4) as a whole, rather than in terms merely of improvement to an existing conventional assembly.
Figure 5:
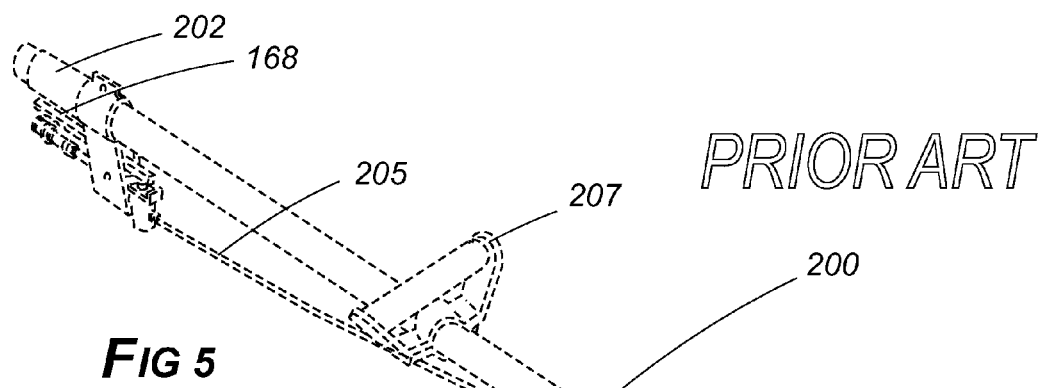
FIGS. 5-7 portray in perspective, prior art assemblies and features, FIG. 5 illustrating an entire carpet cleaning assembly, FIG. 6 a stair cleaner (250) and FIG. 7, a cut-away overhead view of a wand head (203).
Figure 6:
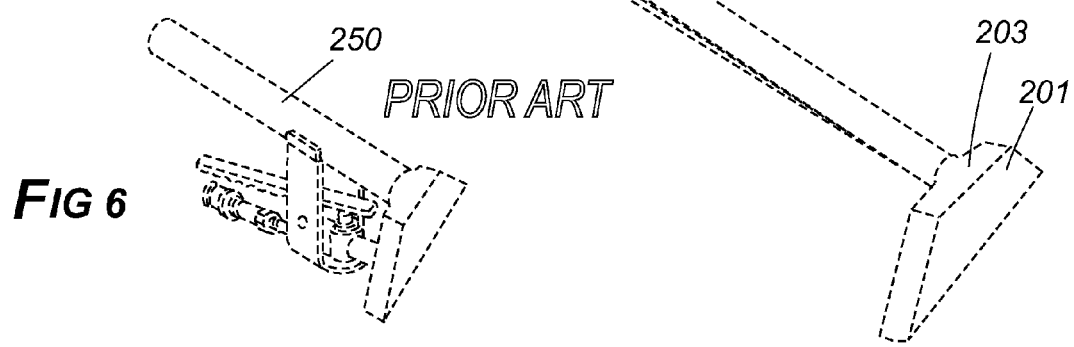
Figure 7:
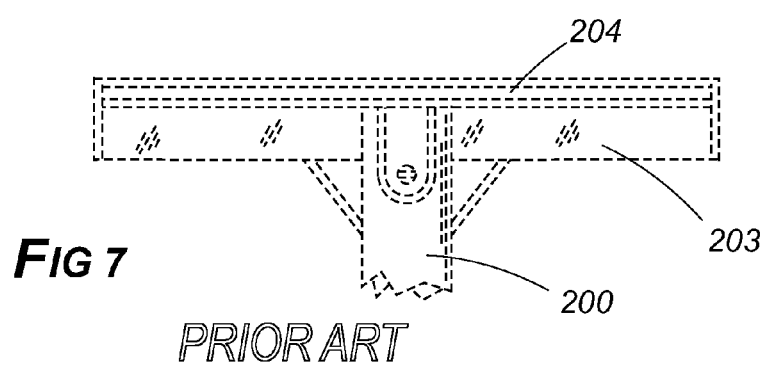
Figure 8:
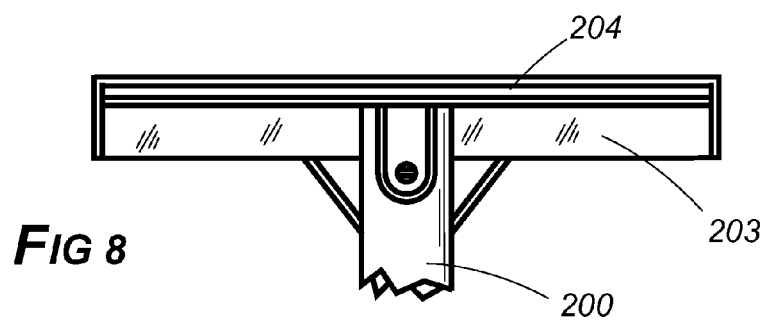
FIG. 8 depicts the same perspective cut-away overhead view of a wand head (203) addressed for FIG. 7 as part of the inventive subject matter hereof.

Although the operator (500) is considerably relieved from the physiologically fatiguing back-borne problems, supra, by the provision of the stabilizing leg extension (1) itself, the subject matter hereof provides also for the inclusion of bicycle-like handlebars (4), the handles comprising a yoke attached to the cleaning wand (200) and extending backwards toward the operator (500) to the left and the right, respectively, disposing one for each of the operator's (500) hands. Moreover, the size, configuration and disposition of the handlebars (4) is such that they (4) may be gripped to extend the cleaning wand (200) back between the operator's (500) legs, as shown in FIG. 2. It should be readily observed that the combined presence of the stabilizing leg extension (1) and the handlebars (4) lightens the cleaning task considerably.

Although not an absolute requirement, the subject matter hereof conveniently allows for the inclusion of a stowage nest (5) disposed upon the cleaning wand (200), preferably attached upon its (200) upper surface at a point somewhere along its (200) length between the handhold (207) and its cleaning head (203). The stowage nest (5) is provided to accommodate placement of some supplemental cleaning accessory—a stair cleaning extension (250), for instance—and to that end the wand (200) also comprises a cradle (51) into which the accessory (250) may repose during operation and a stop (52), assuring against any slippage or loosening of the accessory (250) from its nest (5).

Figure 9:
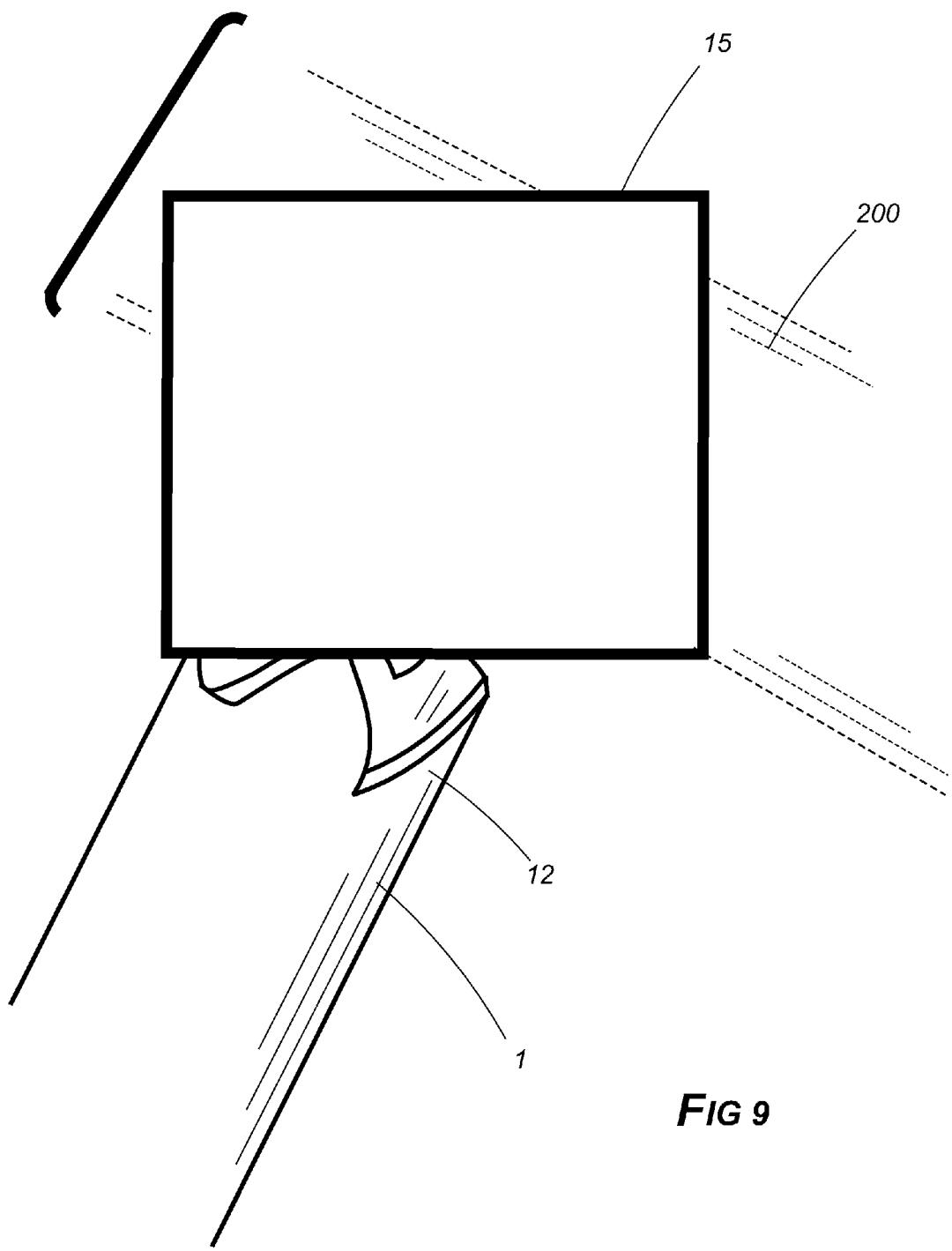
FIG. 9 is a perspective cut-away exploded view of the stabilizing leg extension (1) and the steam cleaning wand (200) at the point of connective intersection, wherein the connection means (15) is shown in a generic representation.
Figure 10:
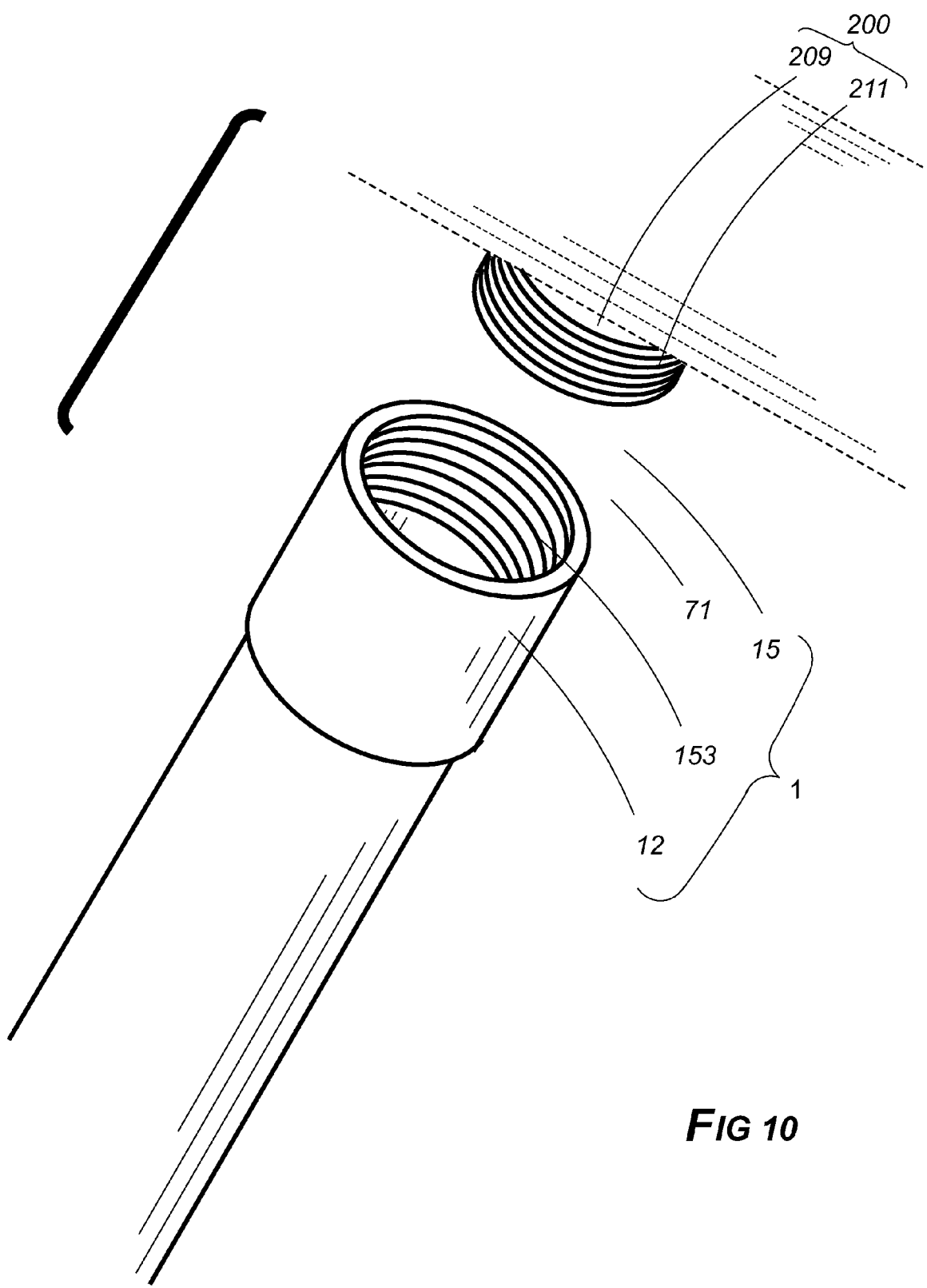
FIG. 10 is a perspective cut-away exploded view of the same subject matter shown in FIG. 9, wherein the connection means (15) is shown specifically as one of inter-threading (71).
Figure 11:
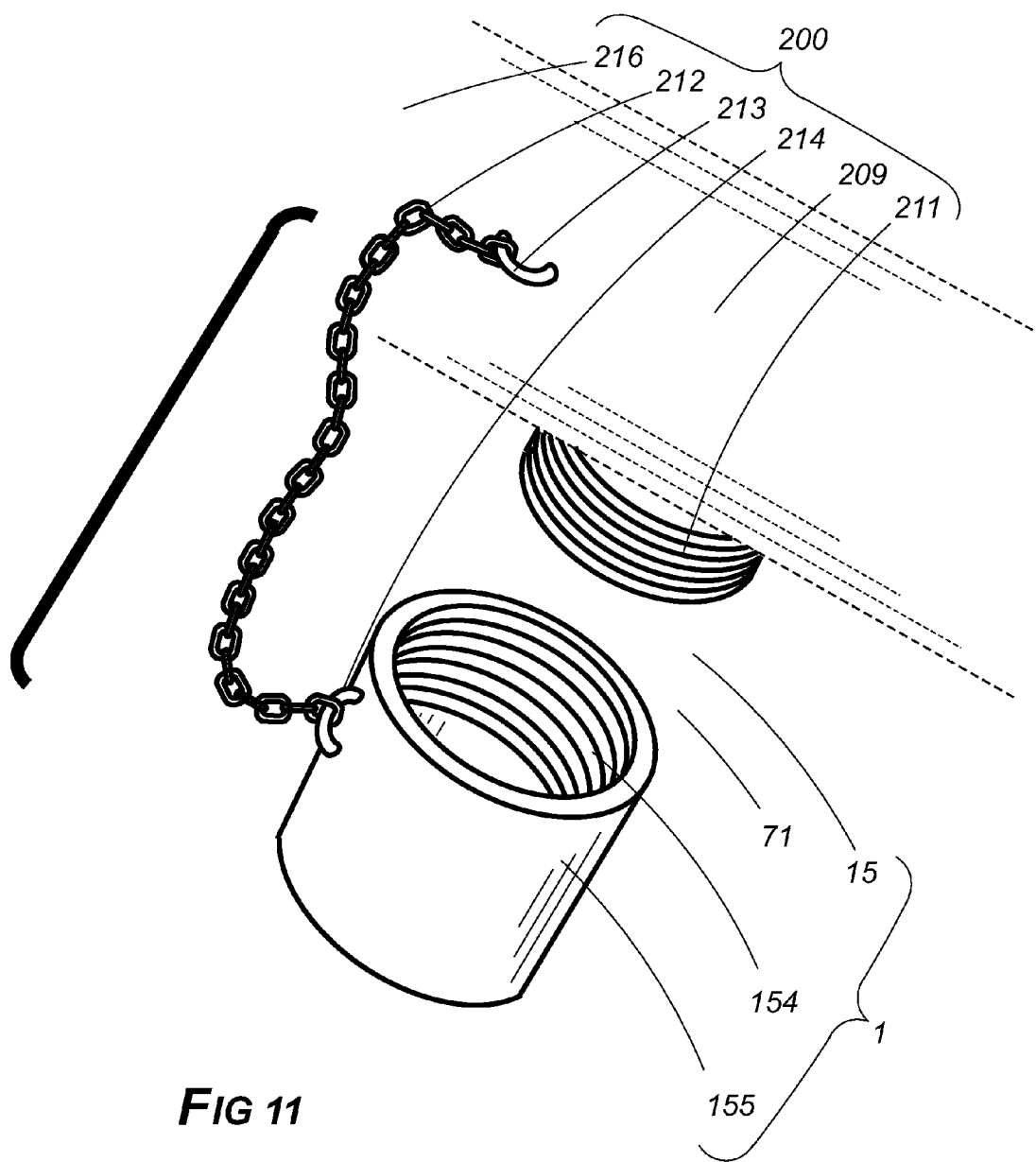
FIG. 11 is a perspective cut-away exploded view illustrating a connection nipple (209) disposed upon the cleaning wand (200) together with a cap (155) disposed for inter-threading thereon (209).
Figure 12:
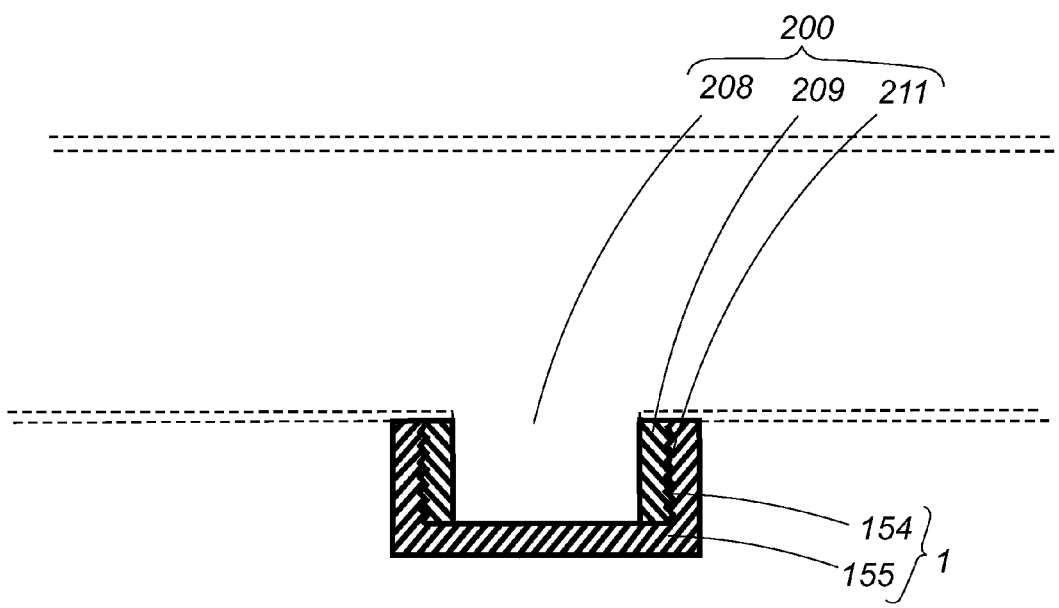
FIG. 12 is a cross-sectional view of the subject matter of FIG. 11.
Figure 21:
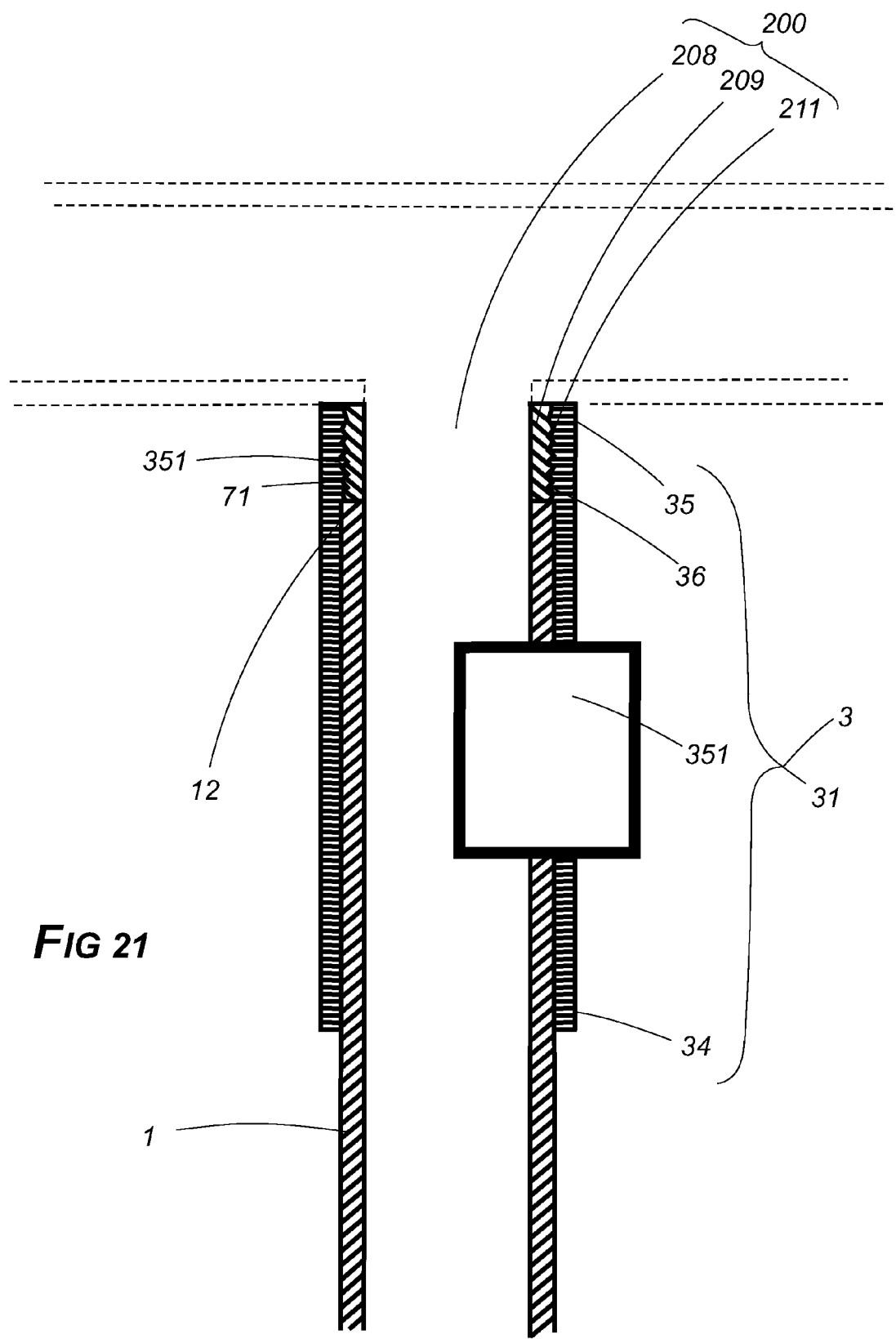
FIG. 21 comprises a cross-sectional view of the height adjustment assembly showing generic means of adjustment (351).
Figure 22:
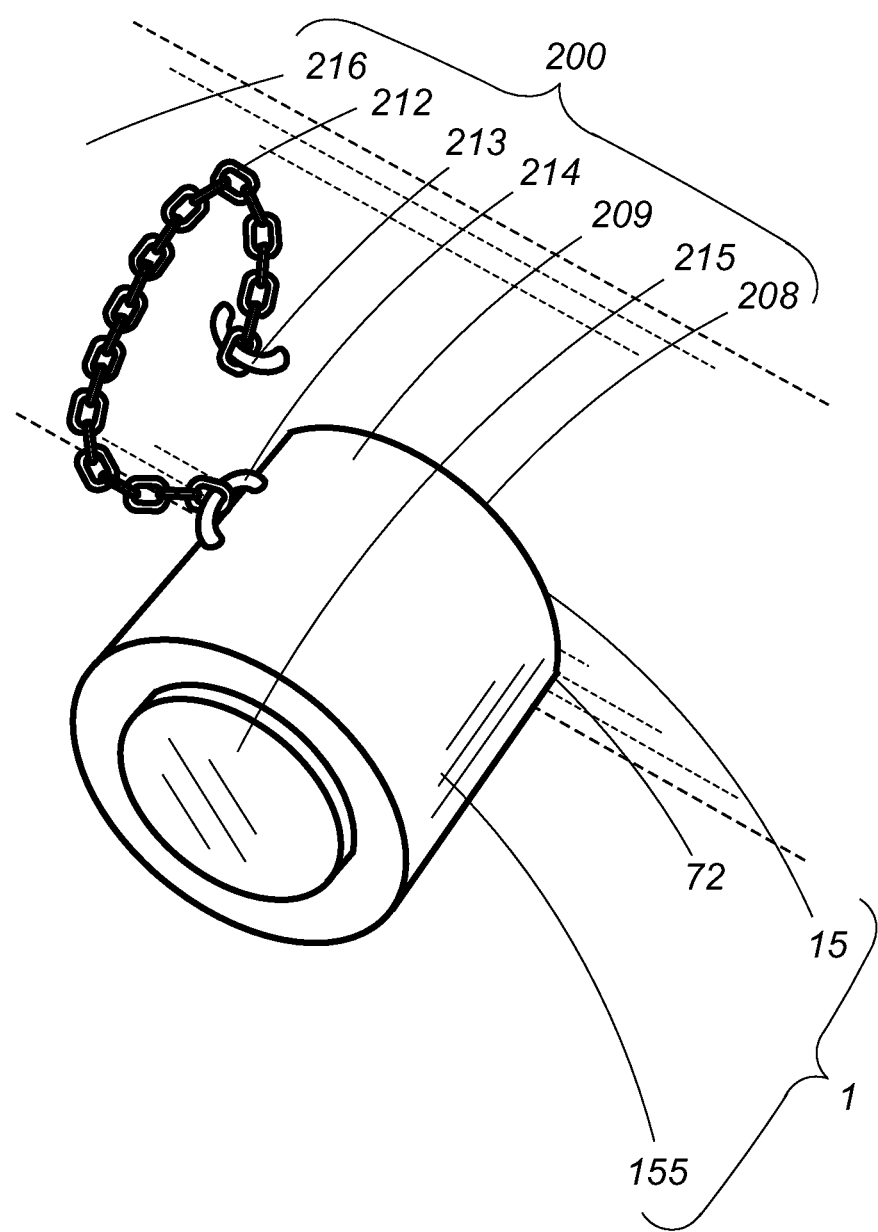
FIG. 22 illustrates a force-fitted (72) connection cap for the steam cleaning wand's connection nipple (209).

There are a number of ways in which the stabilizing leg (1) can be connected to the cleaning wand (200) at the connection orifice (208) thereof (200). It is, therefore, first directed in a generally way that the connection be accomplished by unspecified connection means (15). This is graphically illustrated in FIGS. 9 and 21 by the heavily framed generic rectangle. However, specific preferences for the connection means (15) are also addressed herein.

One highly dependable example of connection means (15) comprises that of mutual inter-threading (71). For most means (15), it is required there be present on the cleaning wand (200) at the connection orifice (208) a connection nipple (209)—that is, a length of tubing—usually short—attached to the cleaning wand (200) at the situs of the connection orifice (208). Where inter-threading (71) comprises the connection means (15), the nipple (209) is made to comprise a threaded exterior sector (211) to which the connective end (12) of the stabilizing leg extension (1)—or the stabilizing leg extension connective end (34) of the height adjustment connection tube (31), if present, ante—comprising a threaded interior sector (153) mated to it (211) is joined. The removal of the stabilizing leg extension (1)—or height adjustment connection tube (31), ante—by unthreading, of course, would ordinarily leave a troublesome air leak during steam cleaning operation. A connection cap (155) comprising interior threads (154) mated to the nipple's threaded exterior sector (211) is, therefore, also provided to seal off otherwise escaping flow of air or soiled liquid. To prevent misplacement or loss, a tethering chain (212) is preferably provided secured at one end by a cleaning wand tethering chain anchor (213) and at the other end by a nipple cap tethering chain anchor (214).

A connection means (15) which might be considered simpler in usage comprises telescopic force-fitted components (72). Again, the cleaning wand (200) is configured to comprise a connection nipple (209) disposed at the wand's connection orifice (208), in this instance de hors the exterior threading. Instead, as with numerous assemblages of the prior art, the nipple (209) is configured with an outer diameter less than the inner diameter of the portion of the stabilizing leg extension (1)—or height adjustment connection tube (31), if such is the case, ante—which connects to it (209). So forming the connective members allows them to be telescopically force-fitted together (72). Experience has demonstrated that such connection schemes are suitably reliable for purposes of interchange of parts. However, to contend with the airflow and soiled liquid leakage occurring upon disconnection of the parts (1, 31, 200), a connection cap (155) is provided as for inter-threading means, supra, and similarly tethered (212) with anchors (213, 214) but now configured for force-fitting (72) with the connection nipple (209) to effectively seal it (209) off.

To accommodate carpet steam cleaning operators (500) of different height or arm length, the stabilizing leg extension (1) is preferably configured to comprise height adjustment means (3) to vary the cleaning wand's (200) height. The means (3) comprises a height adjustment connection tube (31) comprising a height adjustment stabilizing leg extension connective end (34) disposed upon the leg extension's connective end (12) in a sleeved manner, the height adjustment connection tube's stabilizing leg extension connective end (34) comprising inner diameter greater than the stabilizing leg extension connective end's (12) outer diameter. The height adjustment means (3) further comprises a height adjustment cleaning wand connective end (35) disposed by height adjustment tube-to-cleaning wand connection means (351) upon the cleaning wand's connection nipple (209), the height adjustment connection tube's cleaning wand connective end (35) comprising inner diameter greater than the connection nipple's (209) outer diameter. The connections are disposed to assure that the passage of suctioned air and soiled liquid withdrawn through the cleaning ends (201, 12, respectively) of both the wand (200) and each leg extension (1) comprises one of continuous communication.

The height adjustment means (3) comprises an arrangement in which a height adjustment pin (18) disposed upon the stabilizing leg extension (1) is caused to engage one of a plurality of height adjustment pin receptacle detents (32) disposed in the height adjustment connection tube (31). In the simplest height adjustment means (3), the pin (18) is disposed by attachment to and protrudes from the exterior of the stabilizing leg extension (1) and the height adjustment connection tube (31) is configured to comprise a height adjustment channel (33) disposed therein (31) in communication with the pin receptacle detents (32). In an assembly so provided, the height adjustment pin (18) may be disposed to engage any selected one of the height adjustment pin receptacle detents (32) to vary the cleaning wand's (200) height. To readjust height, the adjustment connection tube (31) may be manipulated such that the pin (18) engaged within a first pin receptacle detent (32) may be disengaged therefrom (32) and, together with the stabilizing leg (1) by reason of its (18) attachment thereto (1), advanced or withdrawn along the height adjustment channel (33) within the height adjustment connection tube (31) to dispose the pin (18) at a second selected pin receptacle detent (32) and caused to engage it (32).

Other height adjustment means (3) may be devised, however. One (3) closely related to the foregoing (3) functions much in the manner of the mast of a beach umbrella, again comprising a height adjustment connection tube (31) comprising a plurality of pin receptacle detents (32), wherein the pin (181) is spring-loaded by reason of a tensioned spring (182) disposed within the stabilizing leg extension (1). In this arrangement, when the height adjustment pin (181) is depressed during engagement within a first pin receptacle detent (32), it compresses the tensioned spring (182) such that the pin (181) may be disengaged from the first detent (32) and the stabilizing leg extension (1) advanced or withdrawn within the height adjustment connection tube (31). The height adjustment pin (181) may become thereby disposed at a selected second pin receptacle detent (32) and released, causing the spring (182) to expand and urge the pin (181) into engagement in snap-fit locking fashion with the second selected receptacle detent (32).

Because of the disposition of the height adjustment connection tube (31) upon the connective end (12) of the stabilizing leg extension (1) by reason of its (31) connection to that end (12)—the portion of the leg extension (1) which would otherwise in the absence of height adjustment means (3) have been disposed to connect to the cleaning wand (200)—the height adjustment connection tube itself (31) must now be configured to substitute for that connection. Such is the reason for assurance of inner diameters and outer diameters discussed supra. And it follows, of course, that where the means of connection (15) of the leg extension (1) to the cleaning wand (200) comprises inter-threading (71), the means of connection of the height adjustment tube (31) to the cleaning wand (200) must also be intern-threading (71), for which the height adjustment tube (31) must, of course, comprise a threaded interior sector (36) at its cleaning wand connective end (35). Similarly, where the means of connection (15) of the stabilizing leg extension (1) to the cleaning wand (200) comprises telescopic force-fitting (72), telescopic force-fitting (72) must also be consistently employed as the connection tube's means of connection (351) to that member (200).

SEQUENCE LISTING

Not Applicable

The inventor hereby claims:

1. A carpet steam cleaner, the carpet steam cleaner comprising a manually manipulated tubular elongated carpet steam cleaning wand comprising a cleaning end and a manipulative end, the wand by reason of its tubular configuration, disposed to withdraw suctioned air and soiled liquid from a carpet through the cleaning end thereof for transfer by conduit to a remote waste collector; the cleaning end configured with a head comprising a cleaning face configured for flush disposition upon the carpet; the carpet steam cleaner further comprising coupled to the wand a steam and cleaning agent hose through which steam and cleaning agents are provided, the steam and cleaning agent hose connected to a remote steam generating site, the steam and cleaning agent hose disposed to selectively emit and force pressured steam and cleaning agents from the remote steam generating site into the carpet through the wand head's face, the emissions controlled by operation of a trigger disposed at the wand's manipulative end;

the carpet steam cleaner further comprising a stabilizing leg extension assembly comprising one or more stabilizing leg extensions, each one or more stabilizing leg extension connected to the wand thereof, conferring a bifurcation thereon and extending downward toward the carpet, each one or more stabilizing leg extension comprising for its connection to the wand a connective end, each one or more stabilizing leg extension comprising a cleaning end configured with a head comprising, as in the manner of the wand itself, a cleaning face for flush disposition upon the carpet; each one or more stabilizing leg extension further comprising tubular configuration disposed to withdraw suctioned air and soiled liquid from the carpet through the cleaning end thereof for transfer by conduit to the remote waste collector in the same manner as with the cleaning wand;

the cleaning wand comprising for each one or more stabilizing leg extension a connection orifice disposed therein and a connection nipple of given diameter disposed at the connection orifice, the connective end of each one or more stabilizing leg extension comprising an inner diameter greater than the outer diameter of the connection nipple and connected by connection means to the connection nipple such that the passage of suctioned air and soiled liquid withdrawn through the cleaning ends of both the wand and each one or more stabilizing leg extension comprises one of continuous communication, the passage of air and soiled liquid trough both unimpeded by any obstruction where the two are joined;

the carpet steam cleaner further comprising coupled to each one or more stabilizing leg extension, a length of steam and cleaning agent hose disposed to selectively emit and force pressured steam and cleaning agents from the remote steam generating site into the carpet through the extension head's face in the same manner as with the cleaning wand's steam and cleaning agent hose; the cleaning wand's steam and cleaning agent hose comprising a connection valve and the length of the steam and cleaning agent hose of each one or more stabilizing leg extension disposed by connection to the wand's steam and cleaning agent hose through the connection valve such that the fluvial passage through the hoses of both the cleaning wand and each one or more stabilizing leg extension comprises one of continuous communication, the passage of steam through both unimpeded by any obstruction where the two are joined;

wherein each one or more stabilizing leg extension and each head's cleaning face is formed in size and configuration and disposed to support the weight of the steam cleaning wand and each one or more stabilizing leg extension without tipping when left unattended; and wherein, as the steam cleaning wand comprising the one or more stabilizing leg extension is manipulatively pushed and pulled by an operator across the carpet's surface, the task is lightened by reason of even distribution of weight and the multiplication in size of the cleaned area without increased effort.

2. The carpet steam cleaner according to claim 1 wherein the carpet cleaning wand's manipulative end is configured to comprise handlebars, the handles thereof comprising a yoke attached to the cleaning wand and extending backwards toward the operator to the left and the right, respectively, disposing one for each of the operator's hands; such that by reason of the disposition and configuration of the cleaning wand, the handlebars may be gripped in a manner disposing the wand back between the operator's legs;

wherein ease of the operator's manipulative control during carpet cleaning operation is enhanced.

3. The carpet steam cleaner according to claim 1 wherein the assembly further comprises a stowage nest disposed upon the carpet cleaning wand along its length between the handhold and its head, a cleaning wand further comprising a cradle and a stop, wherein an additional cleaning attachment may be stowed during operation.

4. The carpet steam cleaner according to claim 1 wherein the one or more stabilizing leg extension's means of connection to the carpet cleaning wand comprises inter-threading; wherein the wand's connection nipple comprises exterior threading and the one or more stabilizing leg extension comprises at the connective end thereof interior threading, wherein the two are mated for interthreading.

5. The carpet steam cleaner according to claim 1 comprising a cap comprising an inner diameter greater than the connection nipple's outer diameter, the cap comprising connection means for its connection to the wand's connective nipple; wherein the two are joined to seal the cleaning wand when a stabilizing leg extension is removed from the wand; the cap attached to the cleaning wand by a tethering chain.

6. The carpet steam cleaner according to claim 1 wherein the stabilizing leg assembly further comprises height adjustment means to change the height of the cleaning wand to accommodate operators of different height and arm length, the height adjustment means comprising a height adjustment connection tube comprising a stabilizing leg extension connective end and a cleaning wand connective end; the height adjustment connection tube's stabilizing leg extension connective end comprising inner diameter greater than the outer diameter of each one or more stabilizing leg extension's connective end and disposed over it concentrically in the manner of a sleeve; the height adjustment connection tube joined to the cleaning wand by means of connection, the tube's cleaning wand connective end comprising inner diameter greater than the connection nipple's outer diameter; such that the passage of suctioned air and soiled liquid withdrawn through the cleaning ends of both the wand and each one or more leg extensions comprises one of continuous communication, the passage of air and soiled liquid through both unimpeded by any obstruction where the two are joined;

each one or more stabilizing leg extension comprising a height adjustment pin and the height adjustment connection tube further comprising a plurality of pin receptacle detents selectively disposed for engagement by the height adjustment pin; wherein the height adjustment pin may be disposed to engage any selected one of the height adjustment pin receptacle detents to vary the cleaning wand's height; and wherein the height adjustment connection tube may be manipulated such that the height adjustment pin engaged within a first pin receptacle detent may be disengaged therefrom and, together with the one or more stabilizing leg extension comprising it, advanced or withdrawn within the height adjusting connection tube to dispose the pin at a second selected pin receptacle detent and caused to engage it.

7. The carpet steam cleaner according to claim 6 wherein the height adjustment pin is attached to and disposed to protrude from the exterior of each one or more stabilizing leg extension and a height adjustment channel is disposed within the height adjustment connection tube in communication with the height adjustment receptacle detents;

wherein the height adjustment pin may be disposed to engage any selected one of the height adjustment pin receptacle detents to vary the cleaning wand's height; and wherein the height adjustment connection tube may be manipulated such that the height adjustment pin engaged within a first pin receptacle detent may be disengaged therefrom and, together with each one or more stabilizing leg extension by reason of its attachment thereto, advanced or withdrawn along the height adjustment channel within the height adjusting connection tube to dispose the pin at a second selected pin receptacle detent and caused to engage it.

8. The carpet steam cleaner according to claim 6 wherein the height adjustment pin is spring-loaded by reason of a tensioned spring disposed within each one or more stabilizing leg extension whereupon depressing the height adjusting pin when engaged within a first pin receptacle detent, compresses the tensioned spring, such that the pin may be disengaged therefrom and the stabilizing leg extension advanced or withdrawn within the height adjusting connection tube to dispose the pin at a selected second pin receptacle detent, whereupon the pin may be released causing the spring to expand and the pin to engage the second selected receptacle in snap-fit locking fashion.

9. The carpet steam cleaner according to claim 6 wherein the connection means by which the height adjustment connection tube's cleaning wand connective end is connected to the cleaning wand comprises inter-threading; and at that connective end of the tube, comprises interior threads and the cleaning wand's connection nipple comprises exterior threads wherein the two are mated for inter-threading.

10. The carpet steam cleaner according to claim 6 wherein the connection means by which the height adjustment connection tube's cleaning wand connective end is connected to the cleaning wand comprises welding.

11. The carpet steam cleaner according to claim 1 wherein each one or more stabilizing leg extension is disposed such that the distance between the center of its area of contact with the carpet to the center of the area of contact of the cleaning wand or any other stabilizing leg extension therewith equals or exceeds 18 inches.

12. A stabilizing leg extension assembly configured and disposed for connection to a carpet steam cleaner, the carpet steam cleaner to which connection is made comprising a manually manipulated tubular elongated carpet steam cleaning wand comprising a cleaning end and a manipulative end, the wand by reason of its tubular configuration, disposed to withdraw suctioned air and soiled liquid from a carpet through the cleaning end thereof for transfer by conduit to a remote waste collector; the cleaning end configured with a head comprising a cleaning face configured for flush disposition upon the carpet; the carpet steam cleaner to which the stabilizing leg assembly is configured and disposed for connection further comprising coupled to the wand a steam and cleaning agent hose through which steam and cleaning agents are provided, the steam and cleaning agent hose connected to a remote steam generating site, the steam and cleaning agent hose disposed to selectively emit and force pressured steam and cleaning agents from the remote steam generating site into the carpet through the wand head's face, the emissions controlled by operation of a trigger disposed at the wand's manipulative end; the carpet steam cleaner to which the stabilizing leg extension assembly is configured and disposed for connection further comprising for that connection, one or more connection orifices disposed along the wand between its cleaning end and its manipulative end, the carpet steam cleaner further comprising a connection nipple of given diameter disposed at each one or more connection orifice; the carpet steam cleaner's steam and cleaning agent hose further comprising a connection valve through which one or more additional steam and cleaning agent hoses may be connected;

the stabilizing leg extension assembly itself comprising one or more stabilizing leg extensions extending downward toward the carpet, each one or more stabilizing leg extension conferring upon the wand a bifurcation thereupon; each one or more stabilizing leg extension comprising a connective end and a cleaning end configured with a head comprising, as in the manner of the wand itself, a cleaning face for flush disposition upon the carpet; each one or more stabilizing leg extension disposed for connection at a carpet steam cleaner connection orifice wherein the connective end comprises an inner diameter greater than the outer diameter of the nipple disposed thereat;

each one or more stabilizing leg extension further comprising tubular configuration disposed to withdraw suctioned air and soiled liquid from the carpet through the cleaning end thereof for transfer by conduit to the remote suctioned waste collector in the same manner as with the cleaning wand;

the stabilizing leg extension assembly further comprising coupled to each one or more stabilizing leg extension a length of steam and cleaning agent hose disposed to selectively emit and force pressured steam and cleaning agents from the remote steam generating site into the carpet through the face of the head of each one or more stabilizing extension leg in the same manner as with the cleaning wand's steam and cleaning agent hose; the length of steam and cleaning agent hose of the stabilizing leg extension assembly disposed by connection to the connection valve of the carpet steam cleaner's steam and cleaning agent hose such that the fluvial passage through the hoses of the carpet steam cleaner and each one or more stabilizing leg extension comprises one of continuous communication, the passage of steam therethrough unimpeded by any obstruction where they are joined;

wherein the cleaning faces of the heads of the carpet steam cleaner's wand and each one or more stabilizing leg extension are formed in size and configuration and disposed to support the weight of the steam cleaning wand and each one or more stabilizing leg extension without tipping when left unattended;

wherein, as the carpet steam cleaner comprising the stabilizing leg extension assembly is manipulatively pushed and pulled by an operator across the carpet's surface, the task is lightened by reason of even distribution of weight and the multiplication in size of the cleaned area without increased effort.

13. The stabilizing leg extension assembly for a carpet steam cleaner according to claim 12 wherein the distance between the center of its area of contact with the carpet to the center of the area of contact of the cleaning wand or any other stabilizing leg extension therewith equals or exceeds 18 inches.

14. The stabilizing leg extension assembly for a carpet steam cleaner according to claim 12 wherein each one or more stabilizing leg extension assembly comprises height adjustment means to change the height of the cleaning wand to accommodate operators of different height and arm length, the height adjustment means comprising a height adjustment connection tube comprising a stabilizing leg extension connective end and a cleaning wand connective end; the height adjustment connection tube's stabilizing leg extension connective end comprising inner diameter greater than the outer diameter of the connective end of each one or more stabilizing leg extension and disposed over it concentrically in the manner of a sleeve; the height adjustment connection tube joined to the cleaning wand by means of connection, the tube's cleaning wand connective end comprising inner diameter greater than the connection nipple's outer diameter; such that the passage of suctioned air and soiled liquid withdrawn through the cleaning ends of both the wand and each one or more leg extension comprises one of continuous communication, the passage of air and soiled liquid through both unimpeded by any obstruction where the two are joined;

each one or more stabilizing leg extension comprising a height adjustment pin and the height adjustment connection tube further comprising a plurality of pin receptacle detents selectively disposed for engagement by the height adjustment pin; wherein the height adjustment pin may be disposed to engage any selected one of the height adjustment pin receptacle detents to vary the cleaning wand's height; and wherein the height adjustment connection tube may be manipulated such that the height adjustment pin engaged within a first pin receptacle detent may be disengaged therefrom and, together with the one or more stabilizing leg extension comprising it, advanced or withdrawn within the height adjusting connection tube to dispose the pin at a second selected pin receptacle detent and caused to engage it.

15. The stabilizing leg extension assembly for a carpet steam cleaner according to claim 14 wherein the height adjustment pin is attached to and disposed to protrude from the exterior of each one or more stabilizing leg extension and a height adjustment channel is disposed within the height adjustment connection tube in communication with the height adjustment receptacle detents;

wherein the height adjustment pin may be disposed to engage any selected one of the height adjustment pin receptacle detents to vary the cleaning wand's height; and wherein the height adjustment connection tube may be manipulated such that the height adjustment pin engaged within a first pin receptacle detent may be disengaged therefrom and, together with each one or more stabilizing leg extension by reason of its attachment thereto, advanced or withdrawn along the height adjustment channel within the height adjusting connection tube to dispose the pin at a second selected pin receptacle detent and caused to engage it.

16. The stabilizing leg extension assembly for a carpet steam cleaner according to claim 14 wherein the height adjustment pin is spring-loaded by reason of a tensioned spring disposed within each one or more stabilizing leg extension whereupon depressing the height adjusting pin when engaged within a first pin receptacle detent, compresses the tensioned spring, such that the pin may be disengaged therefrom and the one or more stabilizing leg extension advanced or withdrawn within the height adjusting connection tube to dispose the pin at a selected second pin receptacle detent, whereupon the pin may be released causing the spring to expand and the pin to engage the second selected receptacle in snap-fit locking fashion.

17. The stabilizing leg extension assembly for a carpet steam cleaner according to claim 14 wherein the connection means by which the height adjustment connection tube's cleaning wand connective end is connected to the cleaning wand comprises inter-threading; and at that connective end of the tube, comprises interior threads and the cleaning wand's connection nipple comprises exterior threads wherein the two are mated for inter-threading.

18. A doubled head carpet steam cleaner comprising a tubular elongated carpet cleaning wand configured bifurcated as Y-shaped along its length; the carpet cleaning wand thereby comprising a manipulative end and two cleaning ends; the doubled head carpet steam cleaner further comprising coupled to its wand, a steam hose disposed to selectively emit and force pressured steam and cleaning agents into the carpet through the cleaning ends thereof, the emissions controlled by operation of a trigger disposed at the wand's manipulative end; each cleaning end comprising a head comprising a cleaning face formed for simultaneous flush disposition flatly upon the carpet surface during cleaning operation such that the pressured steam and suctioned soiled liquid are, respectively, forced directly into and withdrawn directly from the carpet through the heads' cleaning faces while the steam cleaning wand is manipulatively pushed and pulled by an operator across the carpet's surface; each head's cleaning face formed in size and configuration and disposed to support the weight of the steam cleaner when left unattended and wherein the operation of a carpet cleaning task is lightened by reason of even distribution of the wand's weight through the wand's doubled cleaning ends and the cleaning area is doubled by reason thereof.

19. The doubled head carpet steam cleaner according to claim 18 wherein the wand's manipulative end is configured and disposed to comprise handlebars in turn comprising left and right extensions, one for each of the operator's hands;

wherein ease of the operator's manipulative control during carpet cleaning operation is enhanced.

20. The doubled head carpet steam cleaner according to claim 18 wherein each Y-shaped wand bifurcation is disposed such that the distance between the center of each of the two heads equals or exceeds 18 inches.

* * * * *